United States Patent
Sasaki et al.

(10) Patent No.: US 12,240,093 B2
(45) Date of Patent: Mar. 4, 2025

(54) TOOL SYSTEM, TOOL MANAGEMENT METHOD, AND PROGRAM

(71) Applicant: Panasonic Intellectual Property Management Co., Ltd., Osaka (JP)

(72) Inventors: Ryosuke Sasaki, Osaka (JP); Masanori Kurita, Osaka (JP); Kouji Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 25 days.

(21) Appl. No.: 17/773,357

(22) PCT Filed: Oct. 14, 2020

(86) PCT No.: PCT/JP2020/038739
§ 371 (c)(1),
(2) Date: Apr. 29, 2022

(87) PCT Pub. No.: WO2021/090651
PCT Pub. Date: May 14, 2021

(65) Prior Publication Data
US 2023/0121849 A1    Apr. 20, 2023

(30) Foreign Application Priority Data
Nov. 6, 2019    (JP) ................... 2019-201820

(51) Int. Cl.
*B25F 5/00*    (2006.01)
*B25B 21/02*    (2006.01)
(Continued)

(52) U.S. Cl.
CPC .............. *B25F 5/00* (2013.01); *G06T 7/0004* (2013.01); *B25B 21/02* (2013.01); *B25B 23/1475* (2013.01); *G06T 2207/30164* (2013.01)

(58) Field of Classification Search
CPC ................. B25F 5/00; G06T 7/0004; G06T 2207/30164; B25B 21/02; B25B 23/1475
See application file for complete search history.

(56) References Cited

U.S. PATENT DOCUMENTS

2008/0319570 A1    12/2008    Van Schoiack
2011/0082576 A1    4/2011    Gamboa et al.
(Continued)

FOREIGN PATENT DOCUMENTS

CN    103786127 A    5/2014
DE    102017203149 A1    10/2018
(Continued)

OTHER PUBLICATIONS

Dobashi, Machine Translation of WO-2018123433-A1, Jul. 2018 (Year: 2023).*
(Continued)

*Primary Examiner* — Veronica Martin
(74) *Attorney, Agent, or Firm* — Rimon P.C.

(57) ABSTRACT

A tool system includes a portable tool, an image capturing unit, and a control unit. The tool includes a driving unit to be activated with power supplied from a power source. The image capturing unit is provided for the tool and generates a captured image. The control unit controls the tool based on the captured image. The control unit has a work support capability. The work support capability is the capability of placing a restriction on operation of the tool when a work target identified based on the captured image does not conform to a working instruction defined by a working (Continued)

procedure. The control unit suspends, when finding a lifting condition satisfied while performing work-support-enabled operation, the work-support-enabled operation and thereby lifts the restriction on the operation of the tool.

12 Claims, 7 Drawing Sheets

(51) Int. Cl.
*B25B 23/147* (2006.01)
*G06T 7/00* (2017.01)

(56) References Cited

U.S. PATENT DOCUMENTS

| | | |
|---|---|---|
| 2017/0197302 A1 | 7/2017 | Kobayashi |
| 2018/0089535 A1 | 3/2018 | Ishiyama et al. |
| 2018/0096531 A1 | 4/2018 | Greenhalgh et al. |
| 2019/0294138 A1 | 9/2019 | Dobashi et al. |
| 2021/0146513 A1 | 5/2021 | Banzola |
| 2022/0022948 A1 | 1/2022 | Fujii et al. |

FOREIGN PATENT DOCUMENTS

| | | | |
|---|---|---|---|
| EP | 2916189 A1 | | 9/2015 |
| EP | 3178064 A1 | | 6/2017 |
| JP | 2002-160180 A | | 6/2006 |
| JP | 2010-224749 A | | 10/2010 |
| JP | 2012-020353 A | | 2/2012 |
| JP | 2012-115941 A | | 6/2012 |
| JP | 2017-074632 A | | 4/2017 |
| JP | 2018-108633 A | | 7/2018 |
| JP | 2019-076980 A | | 5/2019 |
| JP | 2019086827 A | * | 6/2019 |
| JP | 2019-144965 A | | 8/2019 |
| JP | 2019-188599 A | | 10/2019 |
| WO | WO-2018123433 A1 | * | 7/2018 ............. B25B 21/00 |
| WO | 2019/087638 A1 | | 5/2019 |
| WO | 2020/223100 A1 | | 11/2020 |

OTHER PUBLICATIONS

Uchida, Machine Translation of JP-2019086827-A, Jun. 2019 (Year: 2023).*
International Search Report dated Dec. 28, 2020 issued in International Patent Application No. PCT/JP2020/038739, with English translation.
International Search Report dated Dec. 15, 2020 issued in International Patent Application No. PCT/JP2020/038740, with English translation.
International Search Report dated Dec. 28, 2020 issued in International Patent Application No. PCT/JP2020/038737, with English translation.
Extended European Search Report dated Nov. 16, 2022 issued in European Patent Application No. 20884652.7.
Extended European Search Report dated Nov. 22, 2022 issued in European Patent Application No. 20885291.3.
Third Party Observations dated Jul. 6, 2023 issued in the corresponding European Patent Application No. 20884652.7.
Non-Final Office Action dated Apr. 19, 2023 issued in U.S. Appl. No. 17/773,397.
Notice of Reasons for Refusal dated Sep. 12, 2023 issued in the corresponding Japanese Patent Application No. 2019-201820, with English translation.
Chinese Office Action dated Feb. 26, 2024 issued in the corresponding Chinese Patent Application No. 202080076278.0, with English machine translation.
Japanese Office Action dated Feb. 13, 2024 issued in the corresponding Japanese Patent Application No. 2022-571924.
Notice of Reasons for Refusal dated Jan. 14, 2025 issued in the corresponding Japanese Patent Application No. 2019-201820, with English translation.

* cited by examiner

TOOL SYSTEM, TOOL MANAGEMENT METHOD, AND PROGRAM

CROSS-REFERENCE OF RELATED APPLICATIONS

This application is the U.S. National Phase under 35 U.S.C. § 371 of International Patent Application No. PCT/JP2020/038739, filed on Oct. 14, 2020, which in turn claims the benefit of Japanese Patent Application No. 2019-201820, filed on Nov. 6, 2019, the entire disclosures of which Applications are incorporated by reference herein.

TECHNICAL FIELD

The present disclosure generally relates to a tool system, a tool management method, and a program, and more particularly relates to a tool system including a portable tool, a tool management method, and a program.

BACKGROUND ART

Patent Literature 1 discloses a tool system including a portable tool having a driving unit to be activated with power supplied from a battery pack and an image capturing unit provided for the tool. The image capturing unit is arranged to cover, for example, a socket, attached to an output shaft of the tool, within its image capturing range. The image capturing unit captures an image of a work target (which may be, for example, an object or a place on which work is conducted using the tool) while the work is conducted using the tool.

According to Patent Literature 1, the image captured by the image capturing unit is used to identify the work target on which the tool is set in place (i.e., the work target that has been arranged to make the tool ready to start working on the work target). That is to say, the tool system of Patent Literature 1 includes an identification unit. The identification unit compares a captured image generated by the image capturing unit with a plurality of reference images stored in an image storage unit and identify an actually shot work target, shot in the captured image, as the work target. This allows the image capturing unit provided for the tool to identify the work target by a contactless method. In addition, according to Patent Literature 1, when finding the work target, identified by the identification unit, not conforming to a reference working procedure in terms of a working process step for the work target, the tool system performs processing of deactivating the driving unit, for example.

According to such a configuration, however, when a fastening member, on which the work has been done once, needs to be further tightened or subjected to re-tightening from the beginning, or when an irregular type of work needs to be conducted, for example, the operation of the tool may be sometimes too restricted to use the tool for the intended purpose.

CITATION LIST

Patent Literature

Patent Literature 1: JP 2018-108633 A

SUMMARY OF INVENTION

In view of the foregoing background, it is therefore an object of the present disclosure to provide a tool system, a tool management method, and a program, all of which contribute to improving the handiness of the tool.

A tool system according to an aspect of the present disclosure includes a portable tool, an image capturing unit, and a control unit. The portable tool includes a driving unit to be activated with power supplied from a power source. The image capturing unit is provided for the tool and generates a captured image. The control unit controls the tool based on the captured image. The control unit has a work support capability. The work support capability is the capability of placing a restriction on operation of the tool when a work target identified based on the captured image does not conform to a working instruction defined by a working procedure. The control unit suspends, when finding a lifting condition satisfied while performing work-support-enabled operation, the work-support-enabled operation and thereby lifts the restriction on the operation of the tool.

A tool management method according to another aspect of the present disclosure includes a first step, a second step, and a third step. The first step includes acquiring a captured image from an image capturing unit provided for a portable tool including a driving unit to be activated with power supplied from a power source. The second step includes placing a restriction on operation of the tool when a work target identified based on the captured image does not conform to a working instruction defined by a working procedure. The third step includes suspending, when a lifting condition is satisfied during the second step, the second step and thereby lifting the restriction on the operation of the tool.

A program according to still another aspect of the present disclosure is designed to cause one or more processors to perform the tool management method described above.

DESCRIPTION OF EMBODIMENTS

First Embodiment (1) Overview

Figure 1:
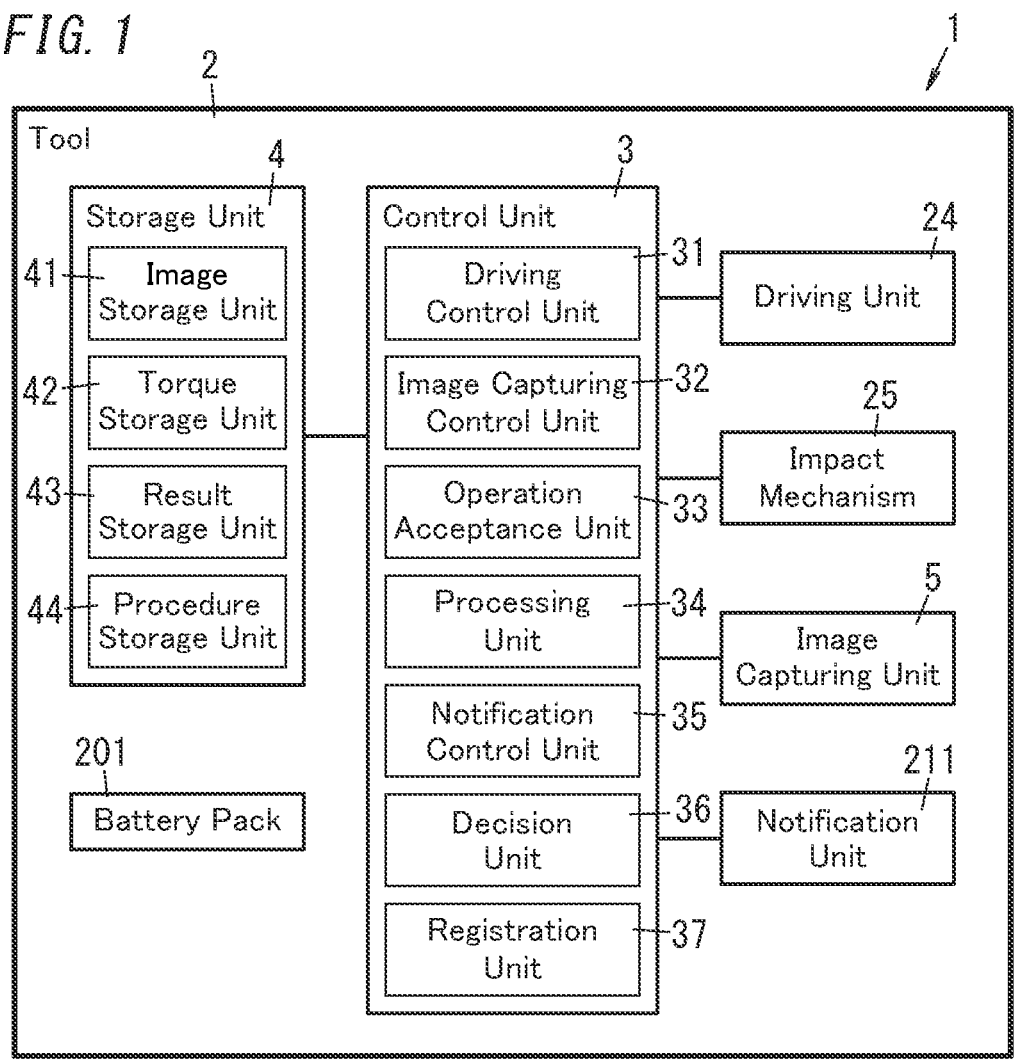
FIG. 1 is a block diagram of a tool system according to a first embodiment.

First, an overview of a tool system 1 according to an exemplary embodiment will be described with reference to FIG. 1.

A tool system 1 according to this embodiment includes a portable tool 2. The tool 2 includes a driving unit 24 including a motor, for example. The driving unit 24 is activated with motive power (such as electric power) supplied from a power source such as a battery pack 201. Examples of the tools 2 of this type include an impact wrench, a nut runner, an oil pulse wrench, a screwdriver (including an impact screwdriver), a drill, a drill-screwdriver, and various other types of tools. Using a tool 2 of this type allows the user to perform various types of machining work such as attaching a fastening member (such as a bolt or a nut) onto a workpiece (target of machining work) as a work target or opening a hole through the workpiece.

In addition, the tool system 1 according to this embodiment further includes an image capturing unit 5. The image capturing unit 5 is provided for the tool 2. The image capturing unit 5 generates a captured image. The image capturing unit 5 covers, in its image capturing range (field of view), a socket 242 (see FIG. 2A) attached to an output shaft 241 (see FIG. 2A) of the tool 2, for example. Thus, while the user is performing work using the tool 2, the image capturing unit 5 captures an image of the work target and generates a captured image.

Thus, the tool system 1 according to this embodiment allows the work target to be identified based on, for example, the captured image generated by the image capturing unit 5, thus enabling, for example, determining whether or not the work that the user is performing using the tool 2 follows the working procedure. In addition, the tool system 1 also enables determining, based on the captured image generated by the image capturing unit 5, whether the work that has been done on the work target is good or bad, notifying the user of a working instruction according to the work target, and storing the image as a log (i.e., record of work). As can be seen, using the image (captured image) generated by the image capturing unit 5 provided for the tool 2 enables, for example, supporting the user with his or her work using the tool 2 or managing his or her work.

The tool system 1 according to this embodiment further includes a control unit 3 in addition to the tool 2 and the image capturing unit 5 as shown in FIG. 1. That is to say, the tool system 1 includes the portable tool 2, the image capturing unit 5, and the control unit 3. The tool 2 includes the driving unit 24 to be activated with power supplied from a power source. The image capturing unit 5 is provided for the tool 2 and generates a captured image. The control unit 3 controls the tool 2 based on the captured image. In this case, the control unit 3 has a work support capability. The work support capability is the capability of placing a restriction on the operation of the tool 2 when a work target identified based on the captured image does not conform to a working instruction defined by a working procedure. The control unit 3 suspends, when finding a lifting condition satisfied while performing operation with the work support capability enabled (hereinafter referred to as "work-support-enabled operation"), the work-support-enabled operation and thereby lifts the restriction on the operation of the tool 2.

According to this configuration, basically, the work support capability allows the control unit 3 to identify, based on a captured image generated by the image capturing unit 5, the work target and determine whether or not the work that the user is performing using the tool 2 follows the working procedure. In addition, the control unit 3 may place a restriction on the operation of the tool 2 when the work target identified based on the captured image does not conform to a working instruction defined by a working procedure i.e., when the work that the user is performing using the tool 2 does not follow the working procedure. This allows the tool system 1 to prevent wrong work, not conforming to the working procedure, from being performed and thereby enables supporting the user with his or her work in conformity with the working procedure. Furthermore, when a lifting condition is satisfied while the control unit is performing the work-support-enabled operation, the tool system 1 according to this embodiment may suspend the work-support-enabled operation and thereby lift the restriction on the operation of the tool 2. Thus, even when a fastening member, on which the work has been done once, needs to be further tightened or subjected to re-tightening from the beginning, or when an irregular type of work needs to be conducted, for example, while the user is performing his or her work following the working procedure, he or she is still allowed to perform the work using the tool 2 just by lifting the restriction on the operation of the tool 2. Consequently, this achieves the advantage of contributing to improving the handiness of the tool 2.

(2) Detailed Configuration

Next, a detailed configuration for the tool system 1 according to this embodiment will be described with reference to FIGS. 1-2B.

(2.1) Premise

The tool system 1 according to this embodiment may be used, for example, in an assembly line for performing assembling work on products at a factory. In particular, in this embodiment, the tool 2 included in the tool system 1 is supposed to be a fastening tool such as an impact wrench for use to tighten a fastening member (such as a bolt or a nut). Specifically, this embodiment is supposed to be applied to a situation where a single product has a plurality of portions to be fastened, thus requiring the user to attach a fastening member onto each of those portions to be fastened by using a tool 2 in a single workplace.

As used herein, the "portion to be fastened" refers to a part of a workpiece (target of machining work), to which the fastening member is attached. For example, if the fastening member is a bolt, then the portion to be fastened is an area surrounding, and covering, a screw hole to which the fastening member is attached. That is to say, in this embodiment, a single workpiece has a plurality of such portions to be fastened.

As used herein, the "work target" refers to an object (such as a workpiece) or a working area on which work is supposed to be performed by using the tool 2. In particular, a work target on which the tool 2 is set in place will be hereinafter sometimes referred to as a "current work target." As used herein, the phrase "the tool 2 is set in place" refers to a situation where the tool 2 has been placed so as to be ready to perform work on the work target. Also, as used herein, the phrase "placed so as to be ready to perform work" refers to not only a situation where the tool 2 is already in contact with the work target but also a situation where the tool 2 is on the verge of being brought into contact with the work target. That is to say, when the tool 2 is set in place on the work target, the tool 2 may be already in contact with the work target or may be still out of contact with the work target. In this embodiment, each of the plurality of portions to be fastened of a single workpiece is supposed to be the work target as an example.

As used herein, the "captured image" refers to an image captured by the image capturing unit 5 and includes a still picture (still image) and a moving picture (motion picture). The "moving picture" further includes a group of still pictures captured by stop-motion shooting, for example. The captured image does not have to be output data itself provided by the image capturing unit 5. For example, the captured image may have been subjected, as needed, to data compression, conversion into another data format, cropping an image portion from the image captured by the image capturing unit 5, focus adjustment, brightness adjustment, contrast adjustment, or any of various other types of image processing. In this embodiment, the captured image is supposed to be a full-color moving picture, for example.

Also, as used herein, if something is "provided for" something else, then the former may be built in (e.g., integrated inseparably with) the latter or may be just attached as an external member to the latter (e.g., removably secured with a coupler, for example). That is to say, the image capturing unit 5 provided for the tool 2 may be built in the tool 2 or just attached as an external member to the tool 2, whichever is appropriate.

Furthermore, as used herein, the "working procedure" means the procedure of the work to be performed using the tool 2. For example, if a series of working process steps to be performed on either a single work target or a plurality of work targets is defined to be a single working process, then the working procedure indicates the order in which the working process steps are supposed to be performed on the single work target or the plurality of work targets through the working process. More specifically, if the instruction on the work to be done on a single work target is a "working instruction," then the working procedure is information indicating either a single working instruction or a plurality of working instructions for the single working process along with the order in which the working process steps are supposed to be performed. In other words, the working procedure indicates which of the single or plurality of working processes the work target corresponds to and also indicates the place in the corresponding working process. In the following description of this embodiment, the working procedure is supposed to define in which order the work (including a plurality of working process steps) should be performed on a plurality of work targets in a single workpiece.

(2.2) Configuration for Tool

First, a configuration for a tool 2 in the tool system 1 according to this embodiment will be described with reference to FIGS. 2A and 2B.

Specifically, the tool system 1 according to this embodiment includes a portable tool 2 as described above. In this embodiment, the tool 2 is an electric tool configured to activate the driving unit 24 (see FIG. 1) by using electrical energy. In particular, in this embodiment, the tool 2 is supposed to be an impact wrench. Such a tool 2 may be used to perform fastening work of attaching a fastening member onto a work target. The tool 2 further includes an impact mechanism 25 (see FIG. 1) in addition to the driving unit 24.

In this case, the tool 2 is designed to activate the driving unit 24 with the electric power (electrical energy) supplied from a battery pack 201 by using the battery pack 201 as a power source. In this embodiment, the battery pack 201 is supposed to be counted among the constituent elements of the tool 2. However, the battery pack 201 does not have to be one of the constituent elements of the tool 2. In other words, the battery pack 201 may be counted out of the constituent elements of the tool 2.

The tool 2 further includes a body 20. In the body 20, housed are the driving unit 24 and the impact mechanism 25. In addition, the image capturing unit 5, the control unit 3, a storage unit 4, and a notification unit 211, which are included in the tool system 1 as will be described later, are also housed in the body 20. That is to say, in this embodiment, the image capturing unit 5, the control unit 3, the storage unit 4, and the notification unit 211, which are constituent elements of the tool system 1, are housed in the body 20 of the tool 2 and thereby integrated with the tool 2.

The body 20 of the tool 2 includes a barrel 21, a grip 22, and an attachment member 23. The barrel 21 is formed in a cylindrical shape (e.g., circular cylindrical shape in this embodiment). The grip 22 protrudes along a normal to a part of the circumferential surface of the barrel 21 (i.e., along the radius of the barrel 21). To the attachment member 23, the battery pack 201 is attached removably. In this embodiment, the attachment member 23 is provided at the tip of the grip 22. In other words, the barrel 21 and the attachment member 23 are coupled together via the grip 22.

At least the driving unit 24 is housed in the barrel 21. The driving unit 24 includes a motor. The driving unit 24 is configured to be activated with the power supplied from the battery pack 201 as a power source to the motor. An output shaft 241 protrudes from one axial end surface of the barrel 21. The output shaft 241 turns around a rotational axis Ax1, which is aligned with the direction in which the output shaft 241 protrudes, as the driving unit 24 is activated. That is to say, the driving unit 24 drives the output shaft 241 in rotation around the rotational axis Ax1. In other words, as the driving unit 24 is activated, torque is applied to the output shaft 241, thereby causing the output shaft 241 to turn.

A cylindrical socket 242 for rotating a fastening member (such as a bolt or a nut) is attached removably onto the output shaft 241. The socket 242 turns along with the output shaft 241 around the output shaft 241. The size of the socket 242 attached to the output shaft 241 may be selected as appropriate by the user according to the size of the fastening member. According to such a configuration, activating the driving unit 24 causes the output shaft 241 to turn, thus causing the socket 242 to rotate along with the output shaft 241. If a fastening member is fitted into the socket 242 at this time, then the fastening member turns along with the socket 242, thus having the work of tightening or loosening the fastening member done. In this manner, the tool 2 may have the work of tightening or loosening the fastening member done by activating the driving unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The tool 2 includes the impact mechanism 25 as described above. The impact mechanism 25 is configured to, when (the work value of) fastening torque exceeds a predetermined level, apply impacting force in the rotational direction of the output shaft 241. This allows the tool 2 to apply greater fastening torque to the fastening member.

The grip 22 is a portion to be gripped by the user while he or she is performing the work. The grip 22 is provided with a trigger switch 221 and a forward/reverse switch 222. The trigger switch 221 is a switch for controlling the ON/OFF states of the operation performed by the driving unit 24 and allows adjusting the number of revolutions of the output shaft 241 according to how deep the trigger switch 221 is pulled. The forward/reverse switch 222 is a switch for switching the rotational direction of the output shaft 241 from the clockwise direction into the counterclockwise direction, and vice versa.

The attachment member 23 is formed in the shape of a compressed rectangular parallelepiped. The battery pack 201 is attached removably to one side, opposite from the grip 22, of the attachment member 23.

The battery pack 201 includes a case 202 made of a resin and formed in a rectangular parallelepiped shape. The case 202 houses a rechargeable battery (such as a lithium-ion battery) inside. The battery pack 201 supplies electric power to the driving unit 24, the control unit 3, the image capturing unit 5, and other constituent members.

The attachment member 23 is also provided with a control panel 231. The control panel 231 may include a plurality of press button switches 232 and a plurality of LEDs (light-emitting diodes) 233, for example. The control panel 231 allows the user to enter various types of settings for, and confirm the state of, the tool 2. That is to say, by operating the press button switches 232 of the control panel 231, the user is allowed to change the operation mode of the tool 2 or the check the remaining capacity of the battery pack 201, for example.

The attachment member 23 further includes a light-emitting unit 234. The light-emitting unit 234 includes an LED, for example. The light-emitting unit 234 emits light toward the work target while the user is performing work using the tool 2. The light-emitting unit 234 may be turned ON and OFF by operating the control panel 231. Alternatively, the light-emitting unit 234 may also be lit automatically when the trigger switch 221 turns ON.

(2.3) Overall Configuration for Tool System

Next, an overall configuration for the tool system 1 according to this embodiment will be described with reference to FIG. 1.

As described above, the tool system 1 includes the portable tool 2, the image capturing unit 5, and the control unit 3. Also, in this embodiment, the tool system 1 further includes the storage unit 4 and the notification unit 211 in addition to the tool 2 (including the battery pack 201), the image capturing unit 5, and the control unit 3. Note that the storage unit 4 and the notification unit 211 are not essential constituent elements for the tool system 1 but at least one of the storage unit 4 or the notification unit 211 may be omitted as appropriate.

The image capturing unit 5, the control unit 3, the storage unit 4, and the notification unit 211 are housed in the body 20 (see FIG. 2A) of the tool 2. In this embodiment, the image capturing unit 5 and the notification unit 211 may be housed in the barrel 21, for example. The control unit 3 and the storage unit 4 may be housed in either the grip 22 or the attachment member 23.

The image capturing unit 5 is provided for the tool 2 and generates data as a captured image. The image capturing unit 5 may be implemented as a camera including an image sensor and a lens, for example. In this embodiment, the image capturing unit 5 may be housed in (the barrel 21 of) the body 20 of the tool 2 and thereby provided for the tool 2 integrally with the tool 2. The image capturing unit 5 is provided to be oriented toward the tip of the output shaft 241 to capture an image of the work target while the user is performing the work using the tool 2.

Figure 2A:
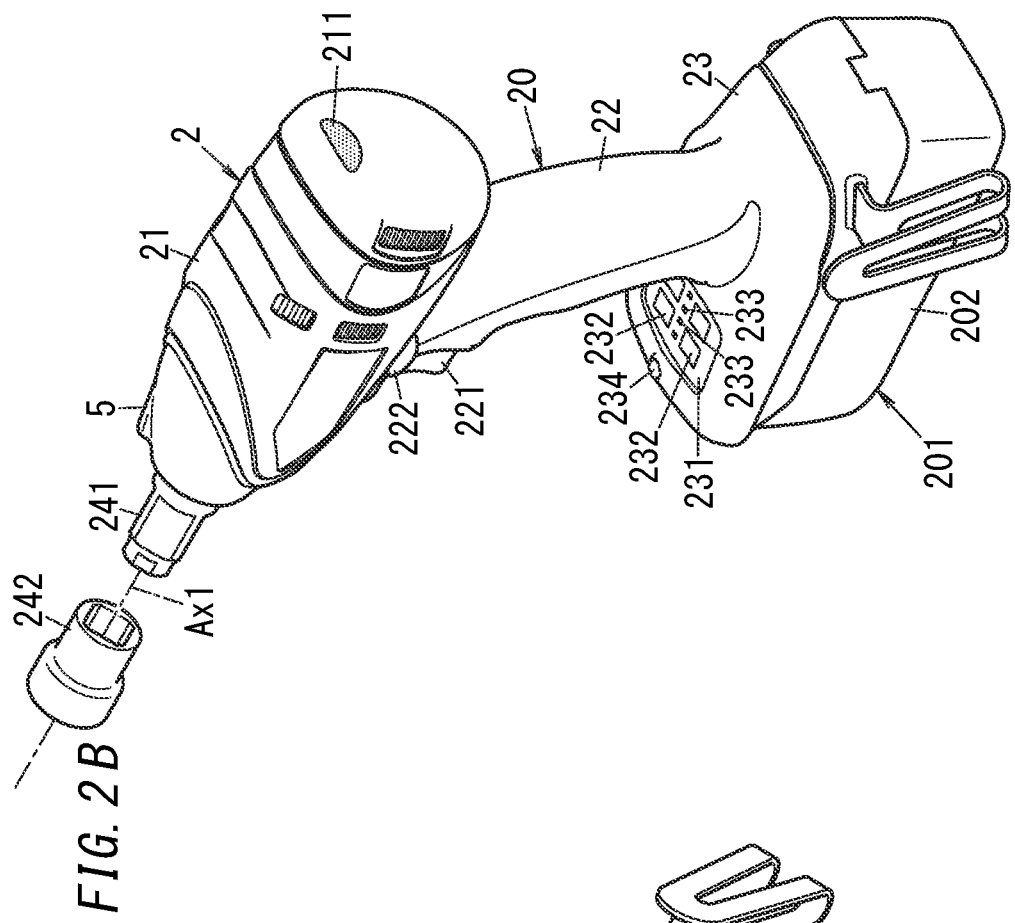
FIG. 2A is a perspective view illustrating the appearance, as viewed from one angle, of a tool included in the tool system.
Figure 2B:
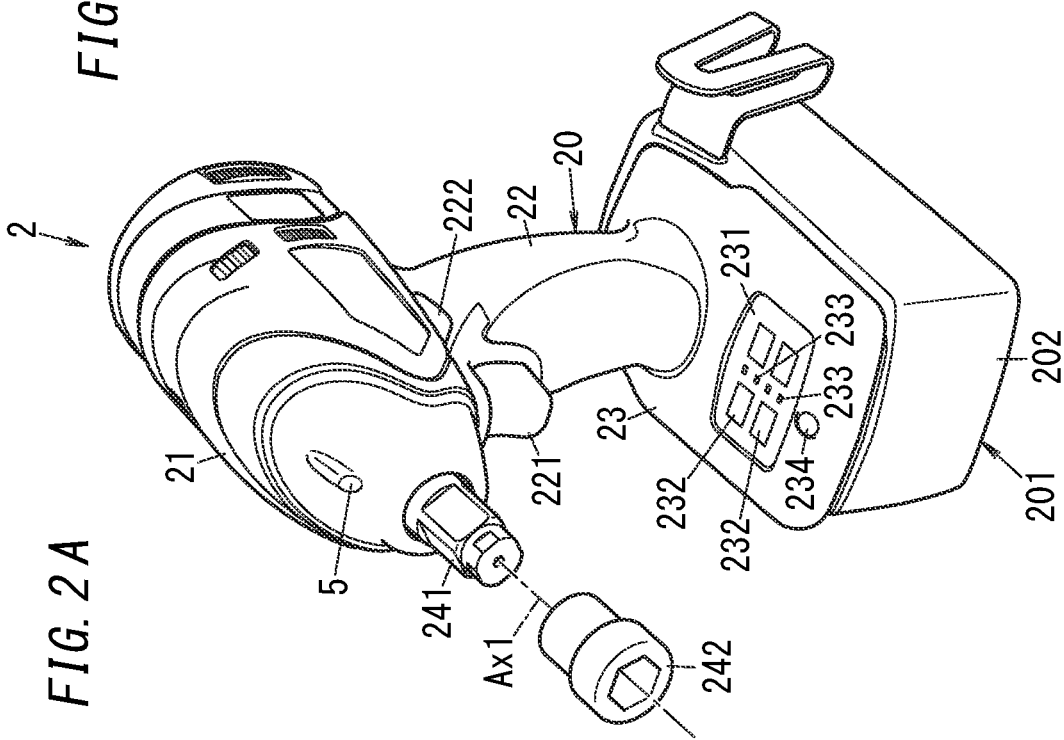
FIG. 2B is a perspective view illustrating the appearance, as viewed from another angle, of the tool included in the tool system.

Specifically, the image capturing unit 5 is provided in a tip portion of the barrel 21 to be oriented toward the tip of the output shaft 241 (i.e., the socket 242) such that the socket 242 attached to the output shaft 241 falls within the image capturing range (see FIGS. 2A and 2B). The optical axis of the image capturing unit 5 is arranged to be aligned with the rotational axis Ax1 of the output shaft 241. In this embodiment, the image capturing unit 5 is arranged such that the optical axis thereof is located within a predetermined range from the rotational axis Ax1 of the output shaft 241 and that the rotational axis Ax1 and the optical axis are substantially parallel to each other. Also, the image capturing unit 5 is configured to capture images continuously while the control unit 3 is activated and generate a time series of captured images in the form of a moving picture and output the moving picture to a processing unit 34 of the control unit 3.

The notification unit 211 may be implemented as an LED, for example. The notification unit 211 may be provided for the other end, opposite from the output shaft 241, of the barrel 21 of the body 20 so as to be easily viewed by the user during the work (see FIG. 2B).

The control unit 3 may include, as a major constituent element thereof, a microcontroller including one or more processors and one or more memories, for example. The microcontroller performs the function of the control unit 3 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause one or more processors to function as the control unit 3.

As described above, the control unit 3 has the work support capability of placing a restriction on the operation of the tool 2 when a work target identified based on the captured image generated by the image capturing unit 5 does not conform to a working instruction defined by a working procedure. In addition, the control unit 3 is also configured to, when finding a lifting condition satisfied while performing work-support-enabled operation, suspend the work-support-enabled operation and thereby lift the restriction on the operation of the tool 2. That is to say, in this embodiment, the control unit 3 is configured to not always enable the work support capability but to disable the work support capability when finding a certain lifting condition satisfied. In other words, the control unit 3 is configured to selectively enable or disable the work support capability.

The control unit 3 performs the functions of a driving control unit 31, an image capturing control unit 32, an operation acceptance unit 33, the processing unit 34, a notification control unit 35, a decision unit 36, and a registration unit 37, for example. Note that if no operating command is entered into the trigger switch 221 or the control panel 231 (see FIG. 2A) for a certain period of time, the control unit 3 enters a sleep mode. The control unit 3 is activated when any operating command is entered, during the sleep mode, into either the trigger switch 221 or the control panel 231.

The driving control unit 31 controls the driving unit 24. Specifically, the driving control unit 31 activates the driving unit 24 to make the output shaft 241 turn at the rotational velocity determined by the press depth of the trigger switch 221 and in the rotational direction set by the forward/reverse switch 222 (see FIG. 2A).

The driving control unit 31 also controls the driving unit 24 such that the fastening torque becomes equal to a torque setting (working setting). The driving control unit 31 has a torque estimating function of estimating the magnitude of the fastening torque. In this embodiment, the driving control unit 31 estimates, until the estimated value of the fastening torque reaches a seating determination level, the magnitude of the fastening torque based on the number of revolutions or any other parameter of the driving unit 24 (motor). When the estimated value of the fastening torque reaches the seating determination level, the driving control unit 31 estimates the magnitude of the fastening torque based on the number of strokes by the impact mechanism 25. When finding the number of stokes by the impact mechanism 25 has reached a threshold number of times based on the torque setting, the driving control unit 31 determines that the fastening torque should have reached a torque setting, and stops running the driving unit 24 (i.e., the motor). This allows the tool 2 to fasten the fastening member with a fastening torque that exactly matches the torque setting. The "torque setting" will be described in detail later.

The image capturing control unit 32 controls the image capturing unit 5. The image capturing control unit 32 controls the image capturing unit 5 to make the image capturing unit 5 capture an image of the work target at least during the work using the tool 2. In this manner, the image capturing control unit 32 makes the image capturing unit 5 capture an image of the work target at least during the work using the tool 2.

The operation acceptance unit 33 has the function of accepting the user's operating command In this embodiment, the operation acceptance unit 33 accepts the user's operating command upon receiving an operating signal to be generated when the trigger switch 221 and the plurality of press button switches 232 (see FIG. 2A) of the control panel 231 are operated. That is to say, when the user operates either the trigger switch 221 or the press button switches 232, an operating signal is generated according to the type of the operation performed and supplied to the operation acceptance unit 33. The operation acceptance unit 33 accepts the user's operating command by receiving such an operating signal. For example, suppose a particular operation such as pressing the trigger switch 221 and the press button switches 232 simultaneously is defined as a "lifting operation." In that case, receiving the operating signal generated when the user performs such a particular operation on the trigger switch 221 and the press button switches 232 means that the operation acceptance unit 33 has accepted the lifting operation.

The processing unit 34 performs processing based on the captured image. The processing unit 34 performs a predetermined type of processing based on the captured image at least while the control unit 3 is performing the work-support-enabled operation (i.e., as long as the work support capability is enabled).

In this embodiment, the processing unit 34 performs the processing of identifying, as a current work target, a work target, shot on the spot in the captured image (hereinafter referred to as an "actually shot work target"), out of a plurality of work targets. That is to say, the processing unit 34 has the function of identifying the current work target, i.e., the work target on which the tool 2 is set in place. Specifically, the processing unit 34 performs, on the captured image, pattern matching processing using a plurality of reference images corresponding to the plurality of work targets as template data, thereby identifying the actually shot work target. That is to say, the processing unit 34 identifies the work target shot on the spot in the captured image by comparing the captured image with the plurality of reference images corresponding to the plurality of work targets. The processing unit 34 recognizes the work target thus identified as the current work target.

The processing unit 34 identifies the work target by performing image processing (pattern matching processing), on a frame basis, on the data output, in a moving picture format (i.e., the captured image), from the image capturing unit 5, for example. Thus, if the work target falls within the image capturing range of the image capturing unit 5, the processing unit 34 may determine which of the plurality of work targets the image capturing unit 5 is now capturing an image of (i.e., which of the plurality of work targets the actually shot work target is). The plurality of reference images are stored in the storage unit 4 (image storage unit 41).

Furthermore, if the work target thus identified does not conform to a working instruction defined by the working procedure, then the processing unit 34 performs at least one of placing a restriction on the operation of the driving unit 24 or making notification. In other words, the processing unit 34 determines whether or not the work target identified by the processing unit 34 (i.e., the actually shot work target) conforms to a working instruction defined by the preset working procedure. That is to say, the processing unit 34 determines whether or not the work target identified by the processing unit 34 agrees with the work target specified by the working instruction included in the working procedure.

Specifically, the processing unit 34 extracts data of a working procedure associated with the actually shot work target from a procedure storage unit 44 of the storage unit 4. Then, the processing unit 34 determines whether or not the work target, subjected to the current working instruction defined by the working procedure that has been extracted from the procedure storage unit 44, agrees with the work target identified as the actually shot work target. If these work targets agree with each other, the processing unit 34 decides that the work target identified should conform to the working instruction defined by the working procedure. On the other hand, if these work targets disagree with each other, the processing unit 34 decides that the work target identified should not conform to the working instruction defined by the working procedure.

When deciding, as a result of such determination, that the work target should not conform to the working instruction defined by the working procedure, the processing unit 34 performs at least one of placing a restriction on the operation of the driving unit 24 or making notification. As used herein, the "notification" includes not only notifying the user but also notifying an external terminal (such as a mobile communications device), for example.

Specifically, when deciding that the work target should not conform to the working instruction defined by the working procedure, the processing unit 34 does not allow the driving unit 24 to be activated even if the trigger switch 221 is pulled. That is to say, the driving unit 24 is allowed to be activated only when the processing unit 34 decides that the work target should conform to the working instruction defined by the working procedure. Thus, even if the tool 2 is set in place on a work target that does not conform to the working procedure, the driving unit 24 remains deactivated, thus prohibiting fastening work from being performed. This may reduce the chances of the work being performed in a wrong order. Optionally, when deciding that the work target should not conform to the working instruction defined by the working procedure, the processing unit 34 may lock the trigger switch 221 to prevent the user from pulling the trigger switch 221 in such a situation.

In addition, when deciding that the work target should not conform to the working instruction defined by the working procedure, the processing unit 34 makes the notification control unit 35 activate the notification unit 211. Thus, the notification unit 211 serves as a user notification unit for notifying the user that the tool 2 is now set in place on a work target that does not conform to the working procedure.

That is to say, the processing unit 34 performs, as predetermined processing based on the captured image, at least target identification processing of identifying the work target. In other words, the processing unit 34 performs at least identification of the work target as (predetermined) processing. In addition, the processing unit 34 further performs, as predetermined processing based on the captured image, procedure determination processing of comparing the work target thus identified with the working instruction defined by the working procedure and determining their correspondence. In other words, the processing unit 34 performs, as (predetermined) processing, determination of the correspondence between the work target thus identified and the working instruction defined by the working procedure. If the result of the procedure determination processing reveals that the work target does not conform to the working instruction, then the processing unit 34 places a restriction on the operation of the driving unit 24 and/or makes notification.

Note that the processing unit 34 performs the procedure determination processing of determining the correspondence between the work target and the working instruction defined by the working procedure and places a restriction on the operation of the driving unit 24 and/or performs notification processing based on the result, only when the work support capability of the control unit 3 is enabled. That is to say, if the control unit 3 has suspended the work-support-enabled operation (i.e., if the work support capability is disabled), then the processing unit 34 does not perform the procedure determination processing in the first place and does not place any restriction on the operation of the driving unit 24 and/or perform notification processing based on the result.

The notification control unit 35 controls the notification unit 211 provided for the tool 2. The notification control unit 35 preferably lights the notification unit 211 differently in a situation where the decision made by the processing unit 34 is disagreement (i.e., when a decision is made that the work target should not conform to the working instruction defined by the working procedure) and in a situation where the processing unit 34 has identified the actually shot work target. For example, if the decision made by the processing unit 34 is disagreement, the notification control unit 35 may light the notification unit 211 in red. On the other hand, if the processing unit 34 has identified the actually shot work target, then the notification control unit 35 light the notification unit 211 in green. This allows the user to recognize, by checking the lighting state of the notification unit 211 with the eye, whether or not the work target conforms to the working procedure. Optionally, when the trigger switch 221 is pulled in a state where the decision made by the processing unit 34 is disagreement, the notification control unit 35 may light the notification unit 211.

The decision unit 36 is configured to determine whether or not the fastening torque is a normal one when the fastening member is attached to the portion to be fastened. In this case, the decision unit 36 preferably determines, in accordance with the working instruction defined by the working procedure, whether or not the fastening torque is a normal one. Specifically, the working instruction defined by the working procedure includes a target torque value associated with the work target. This allows the decision unit 36 to determine, by comparing the target torque value included in the working instruction with the fastening torque, whether or not the work is being performed with the fastening torque specified by the working instruction.

If the driving control unit 31 has deactivated the driving unit 24 on detecting that the number of strokes by the impact mechanism 25 has reached the threshold number of times, for example, then the decision unit 36 decides that the fastening torque should be normal. On the other hand, if the driving control unit 31 has deactivated the driving unit 24 by turning the trigger switch 221 OFF before the number of strokes by the impact mechanism 25 reaches the threshold number of times, for example, then the decision unit 36 decides that the fastening torque should be insufficient (abnormal). The decision unit 36 also performs result storage processing of storing the decision results in the result storage unit 43 in association with the portion to be fastened.

In this case, the tool 2 according to this embodiment has, as its operation modes, at least a working mode and a registration mode. As used herein, the "working mode" refers to an operation mode in which the user performs some type of work using the tool 2. The registration mode refers herein to an operation mode in which a plurality of reference images are stored in the image storage unit 41 and a plurality of target torque values are stored in the torque storage unit 42. The operation mode may be switched by, for example, operating the control panel 231. Alternatively, the operation mode may also be switched by operating another member, such as a dip switch, provided separately from the control panel 231.

The registration unit 37 performs, when the operation mode of the tool 2 is the registration mode, image registration processing of making the image storage unit 41 of the storage unit 4 store the plurality of reference images and torque registration processing of making the torque storage unit 42 of the storage unit 4 store the plurality of target torque values.

The registration unit 37 makes the torque storage unit 42 store, as a target torque value during the torque registration processing, the torque setting when the fastening member is attached to the work target. Specifically, when the operation mode of the tool 2 is the registration mode, the user may enter any arbitrary torque value by operating the control panel 231, and the driving control unit 31 sets the torque value entered as the torque setting. When the fastening member is attached to the work target, the registration unit 37 makes the torque storage unit 42 store, as the target torque value, the torque setting at this time.

In addition, the registration unit 37 also makes, during the image registration processing, the image storage unit 41 store, as a reference image, the still image generated by, for example, having the image capturing unit 5 capture an image of the work target. Specifically, if the operation mode of the tool 2 is the registration mode, the trigger switch 221 also functions as a shutter release button. That is to say, when the trigger switch 221 turns ON, the image capturing unit 5 generates a still image. The registration unit 37 makes the image storage unit 41 store the still image as a reference image.

That is to say, according to this embodiment, if the operation mode of the tool 2 is the registration mode, the trigger switch 221 performs both the function as a switch for activating the driving unit 24 and the function as a shutter release button for generating the reference image. Thus, performing the fastening work when the operation mode of the tool 2 is the registration mode allows the registration unit 37 to perform the torque registration processing and the image registration processing in parallel with each other. Specifically, the registration unit 37 makes the torque storage unit 42 store, as the target torque value, a torque setting during the fastening work and also makes the image storage unit 41 store, as the reference image, a still image of the work target during the fastening work.

The storage unit 4 may be implemented as a semiconductor memory, for example, and performs the function of the image storage unit 41, the torque storage unit 42 (target value storage unit), the result storage unit 43, and the procedure storage unit 44. In this embodiment, the image storage unit 41, the torque storage unit 42, the result storage unit 43, and the procedure storage unit 44 are implemented as a single memory. However, this is only an example and should not be construed as limiting. Alternatively, these storage units 41, 42, 43, and 44 may also be implemented as four different memories. Still alternatively, the storage unit 4 may also be implemented as a storage medium such as a memory card attachable to, and removable from, the tool 2.

The image storage unit 41 stores a plurality of reference image in association with the plurality of work targets. Each reference image is a still image obtained by capturing an associated work target. Optionally, a single work target may be associated with a plurality of reference images obtained by shooting the work target from various angles or in multiple different sizes.

The torque storage unit 42 stores a plurality of target torque values (target values) in association with the plurality of work targets one to one. As used herein, the "target torque value" refers to the target value of a fastening torque when a fastening member is attached to an associated work target.

The result storage unit 43 stores the decision results obtained by the decision unit 36 with respect to a plurality of portions to be fastened in association with the plurality of work targets. It is recommended that the result storage unit 43 store the decision results obtained by the decision unit 36 with time stamps, indicating the working times, added thereto. This allows the work target decision results to be distinguished from one product to another on the assembly line.

The procedure storage unit 44 stores data about a single working procedure or a plurality of working procedures. As described above, the working procedure means the procedure in which work is supposed to be performed using the tool 2 and may be data defining in which order the work should be performed on a plurality of work targets of a single workpiece.

(3) Operation

Next, an exemplary operation of the tool system 1 according to this embodiment will be described with reference to FIGS. 3-6.

In the following example, it will be described how the tool system 1 operates when the user performs the work of assembling two products of the same type (hereinafter referred to as a "first product" and a "second product," respectively) on an assembly line. Each product is supposed to have four work targets (hereinafter referred to as "first, second, third, and fourth work targets," respectively) and the user is supposed to perform the work of attaching a fastening member onto each of these work targets using the tool 2.

(3.1) Registration Mode

First, an exemplary operation of the tool system 1 when the first product is assembled will be described with reference to FIG. 3. In this case, the tool 2 is supposed to be in an initial state in which both the image registration processing and the torque registration processing are yet to be performed by the registration unit 37. That is to say, in the tool 2 in the initial state, none of the first to fourth reference images and first to fourth target torque values corresponding to the first, second, third, and fourth work targets, respectively, are stored in the image storage unit 41 or the torque storage unit 42 yet.

The user sets the operation mode of the tool 2 as registration mode (in S1). Next, the user operates the control panel 231 to enter the torque value of the fastening torque when the fastening member is attached to the first work target (in S2). The driving control unit 31 sets the entered torque value as a torque setting for the first work target. Then, the user performs the fastening work of attaching the fastening member onto the first work target by pulling the trigger switch 221 (in S3). At this time, the first work target is shot, thus generating a still image of the first work target.

When the fastening work is done, the registration unit 37 performs registration processing (including image registration processing and torque registration processing) (in S4). Specifically, the registration unit 37 performs the image registration processing of making the image storage unit 41 store, as a first reference image associated with the first work target, a still image of the first work target generated during the fastening work in Step S3. In addition, the registration unit 37 also performs the torque registration processing of making the torque storage unit 42 store, as a first target torque value associated with the first work target, a torque setting when the fastening member is attached to the first work target during the fastening work in Step S3. That is to say, the first target torque value is associated with the first reference image.

In particular, according to this embodiment, the processing unit 34 performs the procedure determination processing. Thus, in the registration processing, the target torque value is registered to be included in the working instruction. In other words, in the registration processing, the working procedure is registered. In this example, the registration unit 37 registers the working procedure such that the working instruction instructing the work to be done on the first work target becomes the first working instruction in the working procedure. Specifically, the registration unit 37 registers, as the working process step to be performed "in the first place" according to the working procedure, a working instruction instructing the work to be done on the first work target, and this working instruction includes the first target torque value.

The decision unit 36 performs result storage processing of making the result storage unit 43 store, in association with the first work target, a first decision result indicating whether or not the fastening torque when the fastening member is attached to the first work target is a normal one (in S5).

In addition, the user sequentially performs fastening work on the second to fourth work targets in this order following the same working procedure as the first work target. Specifically, the user operates the control panel 231 to enter a torque value of fastening torque when a fastening member is attached to the second work target (in S6) and then performs the fastening work of attaching the fastening member to the second work target (in S7). At this time, a still image of the second work target is generated and the registration unit 37 performs the registration processing (including the image registration processing and the torque registration processing) (in S8). The registration unit 37 registers, as a working process step to be performed "in the second place" according to the working procedure, a working instruction instructing the work to be done on the second work target, and this working instruction includes a second target torque value. The decision unit 36 performs result storage processing of making the result storage unit 43 store a second decision result indicating whether or not the fastening torque during the fastening work in Step S7 is a normal one (in S9).

When the fastening work is done on the second work target, the user performs fastening work on the third work target. Specifically, the user operates the control panel 231 to enter a torque value of fastening torque when a fastening member is attached to the third work target (in S10) and then performs the fastening work of attaching the fastening member to the third work target (in S11). At this time, a still image of the third work target is generated and the registration unit 37 performs the registration processing (including the image registration processing and the torque registration processing) (in S12). The registration unit 37 registers, as a working process step to be performed "in the third place" according to the working procedure, a working instruction instructing the work to be done on the third work target, and this working instruction includes a third target torque value. The decision unit 36 performs result storage processing of making the result storage unit 43 store a third decision result indicating whether or not the fastening torque during the fastening work in Step S11 is a normal one (in S13).

Figure 3:
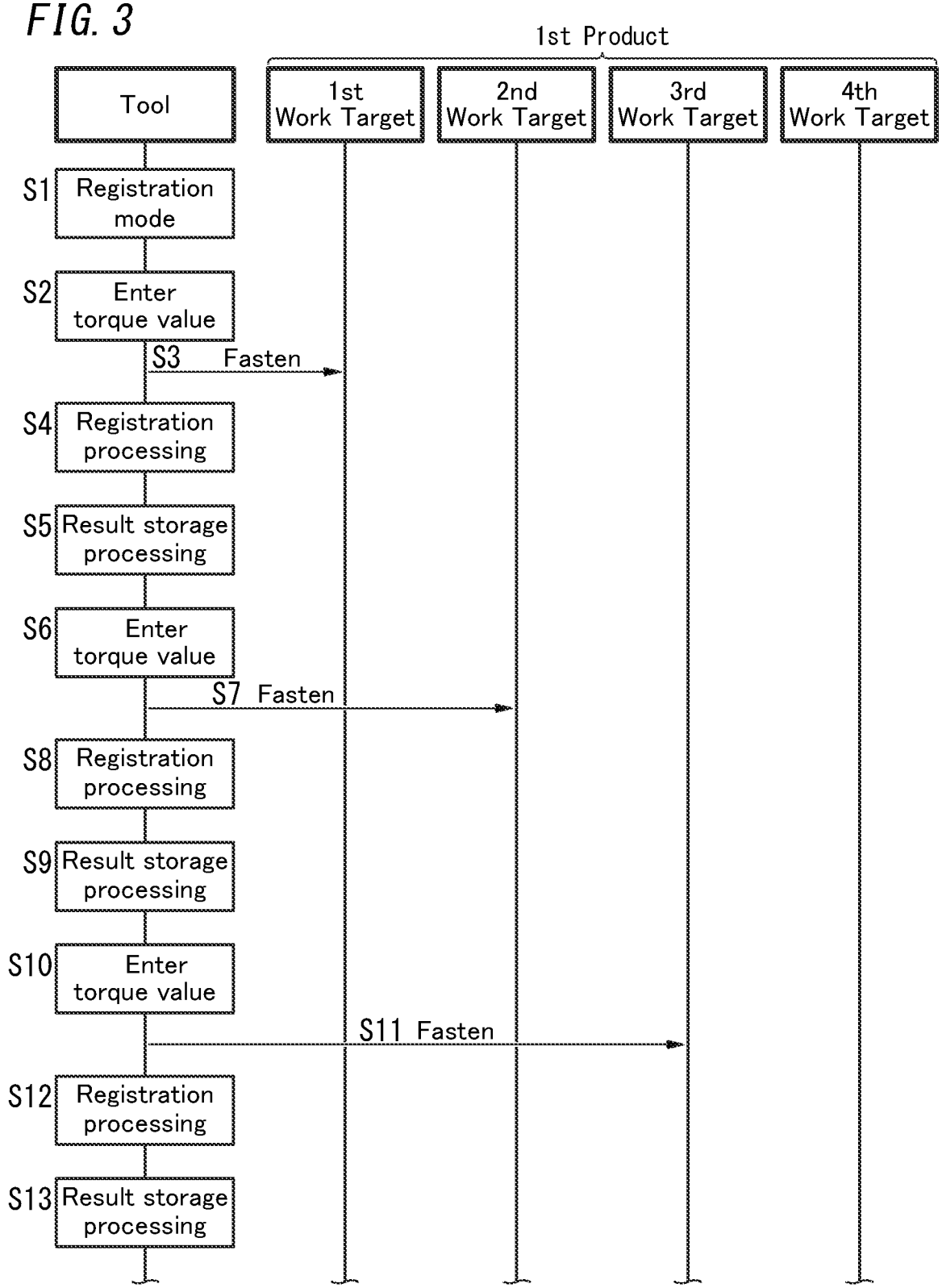
FIG. 3 shows the sequence of operations to be performed by the tool system in a registration mode.

Although not shown in FIG. 3, when the fastening work is done on the third work target, the user performs fastening work on the fourth work target. The same series of process steps as Steps S10-S13 are also performed on the fourth work target. Thus, the registration unit 37 registers, as a working process step to be performed "in the fourth place" according to the working procedure, a working instruction instructing the work to be done on the fourth work target, and this working instruction includes a fourth target torque value.

(3.2) Working Mode

When the work of assembling the first product (i.e., the fastening work on the first to fourth work targets) is finished in the registration mode, the user performs the work of assembling the second product. Next, an exemplary operation of the tool system 1 when the user performs the work of assembling the second product will be described with reference to FIG. 4.

In the following example, an exemplary operation of the tool system 1 in a situation where the control unit 3 is performing the work-support-enabled operation (i.e., the work support capability of the control unit 3 is enabled) will be described. It will be described in the "(3.3) Disabling work support capability" section how the tool system 1 operates in a situation where the control unit 3 suspends the work-support-enabled operation when finding the lifting condition satisfied.

The user operates the control panel 231 to switch the operation mode of the tool 2 from the registration mode to the working mode (in S21). Then, the user performs the work of assembling the second product with the operation mode of the tool 2 set as the working mode.

First, to attach a fastening member onto the first work target, the user sets the tool 2 in place on the first work target. At this time, the image capturing unit 5 generates a captured image of the first work target of the second product (in S22).

The processing unit 34 performs, using the captured image of the first work target that has been generated by the image capturing unit 5, the target identification processing of identifying the first work target to be an actually shot work target (in S23). Furthermore, the processing unit 34 performs the procedure determination processing of determining the correspondence between the first work target thus identified and the working instruction defined by the working procedure (in S24). That is to say, the processing unit 34 performs, based on the captured image generated by the image capturing unit 5, predetermined processing (namely, the target identification processing and the procedure determination processing).

When performing the procedure determination processing, the processing unit 34 determines whether or not the work target thus identified conforms to the working instruction defined by the working procedure, i.e., whether or not the work target conforms to the working procedure. At this time, the processing unit 34 compares the next working instruction in the working procedure that has been read out from the procedure storage unit 44 with the actually shot work target identified. In this case, the next working instruction in the working procedure, i.e., the working instruction for the working process step to be performed "in the first place," is the work to be done on the first work target. Thus, the processing unit 34 finds that both the work target identified and the work target included in the working instruction agree with the first work target.

If the decision made in the procedure determination processing indicates agreement (i.e., if the work target thus identified conforms to the working instruction defined by the working procedure), then the processing unit 34 sets a target torque value included in the working instruction as a torque setting. That is to say, if the work target identified is the first work target, then the processing unit 34 sets the first target torque value associated with the first work target as the torque setting (in S25).

More specifically, the processing unit 34 acquires, when identifying the actually shot work target, a target torque value associated with the actually shot work target from the torque storage unit 42. Then, the processing unit 34 may set the target torque value thus acquired as a torque setting. In addition, once the processing unit 34 has identified the actually shot work target, the processing unit 34 holds the target torque value associated with the actually shot work target as the torque setting until another work target is shot in the captured image. This allows, even if the processing unit 34 has become unable to identify the actually shot work target just before starting the fastening work, for example, the fastening member to be fastened at the target torque value associated with the actually shot work target.

In this state, the user performs the fastening work of attaching a fastening member onto the first work target (in S26). The decision unit 36 performs result storage processing of making the result storage unit 43 store, in association with the first work target, a first decision result indicating whether or not a fastening torque when the fastening member is attached to the first work target is a normal one (in S27).

On the other hand, if the user has failed to follow the working procedure, for example, then the decision made in the procedure determination processing may indicate disagreement, i.e., the work target identified may not conform to the working instruction defined by the working procedure. If the decision made in the procedure determination processing indicates disagreement, then the operation of the driving unit 24 is restricted (suspended) and the notification unit 211 is lit. This allows the user to notice that he or she has failed to follow the correct working procedure.

In addition, the user sequentially performs fastening work on the second to fourth work targets in this order following the same working procedure as the first work target. Specifically, to attach a fastening member onto the second work target, the user sets the tool 2 in place on the second work target. At this time, the image capturing unit 5 generates a captured image of the second work target (in S28). The processing unit 34 performs, using the captured image of the second work target that has been generated, the target identification processing of identifying the second work target to be an actually shot work target (in S29). Furthermore, the processing unit 34 performs the procedure determination processing of determining the correspondence between the second work target thus identified and the working instruction defined by the working procedure (in S30). In this case, the next working instruction in the working procedure, i.e., the working instruction for the working process step to be performed "in the second place," is the work to be done on the second work target. Thus, the processing unit 34 finds that both the work target identified and the work target included in the working instruction agree with the second work target.

Thus, the processing unit 34 sets a second target torque value associated with the second work target as the torque setting (in S31). In this state, the user performs the fastening work of attaching the fastening member onto the second work target (in S32). The decision unit 36 performs result storage processing of making the result storage unit 43 store, in association with the second work target, a second decision result indicating whether or not a fastening torque when the fastening member is attached to the second work target is a normal one (in S33).

When the fastening work is done on the second work target, the user performs fastening work on the third work target. Specifically, to attach a fastening member onto the third work target, the user sets the tool 2 in place on the third work target. At this time, the image capturing unit 5 generates a captured image of the third work target (in S34). The processing unit 34 then performs, using the captured image of the third work target that has been generated, the target identification processing of identifying the third work target to be an actually shot work target (in S35). Furthermore, the processing unit 34 performs the procedure determination processing of determining the correspondence between the third work target thus identified and the working instruction defined by the working procedure (in S36). In this case, the next working instruction in the working procedure, i.e., the working instruction for the working process step to be performed "in the third place," is the work to be done on the third work target. Thus, the processing unit 34 finds that both the work target identified and the work target included in the working instruction agree with the third work target.

Thus, the processing unit 34 sets a third target torque value associated with the third work target as the torque setting (in S37). In this state, the user performs the fastening work of attaching the fastening member onto the third work target (in S38). The decision unit 36 performs result storage processing of making the result storage unit 43 store, in association with the third work target, a third decision result indicating whether or not a fastening torque when the fastening member is attached to the third work target is a normal one (in S39).

Figure 4:
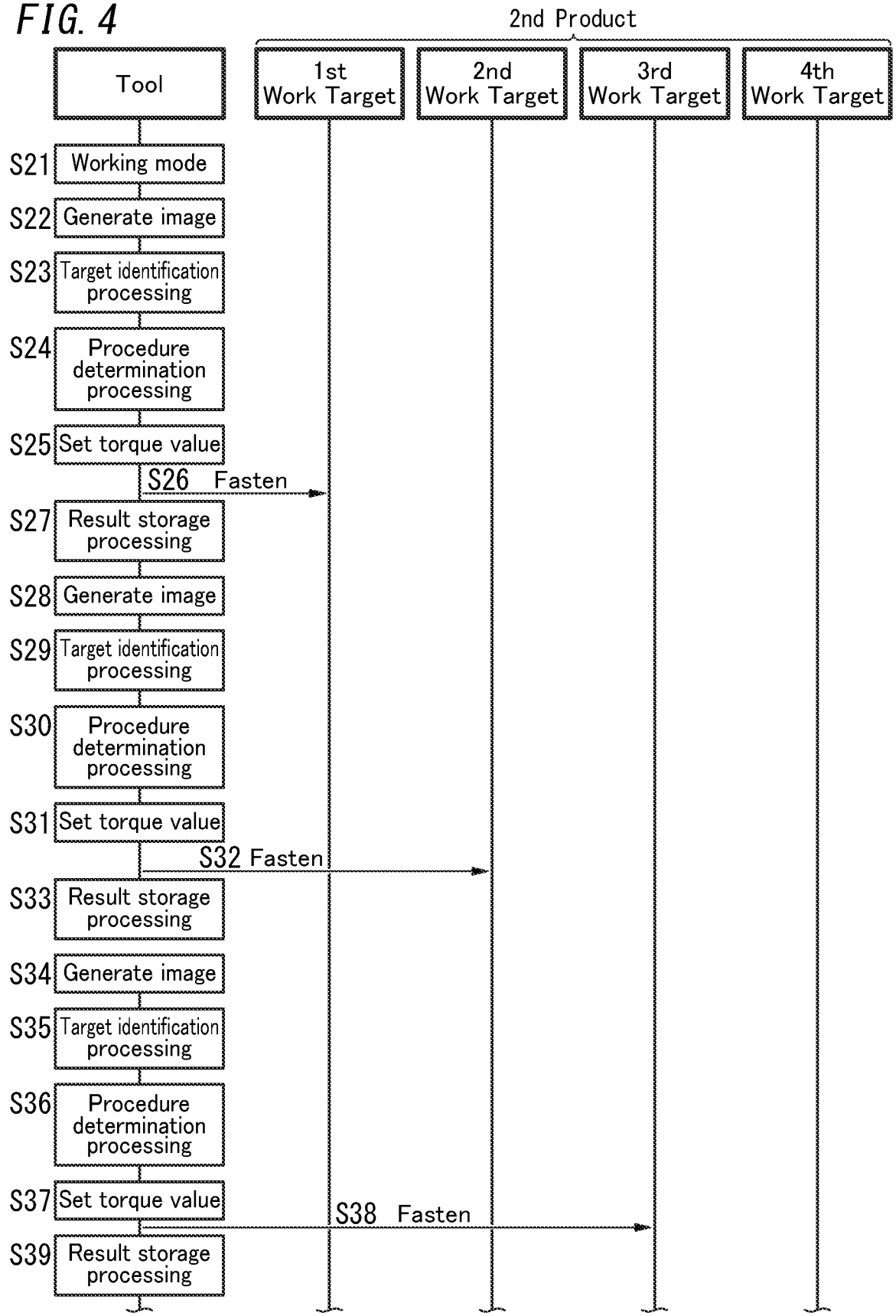
FIG. 4 shows the sequence of operations to be performed by the tool system in a working mode.

Although not shown in FIG. 4, when the fastening work is done on the third work target, the user performs fastening work on the fourth work target. The same series of process steps as Steps S34-S39 are also performed on the fourth work target. Thus, the processing unit 34 identifies, using a captured image of the fourth work target that has been generated by the image capturing unit 5, the fourth work target to be an actually shot work target, and determines the correspondence between the fourth work target thus identified and the working instruction defined by the working procedure. Then, the processing unit 34 sets a fourth target torque value associated with the fourth work target as the torque setting.

Figure 5:
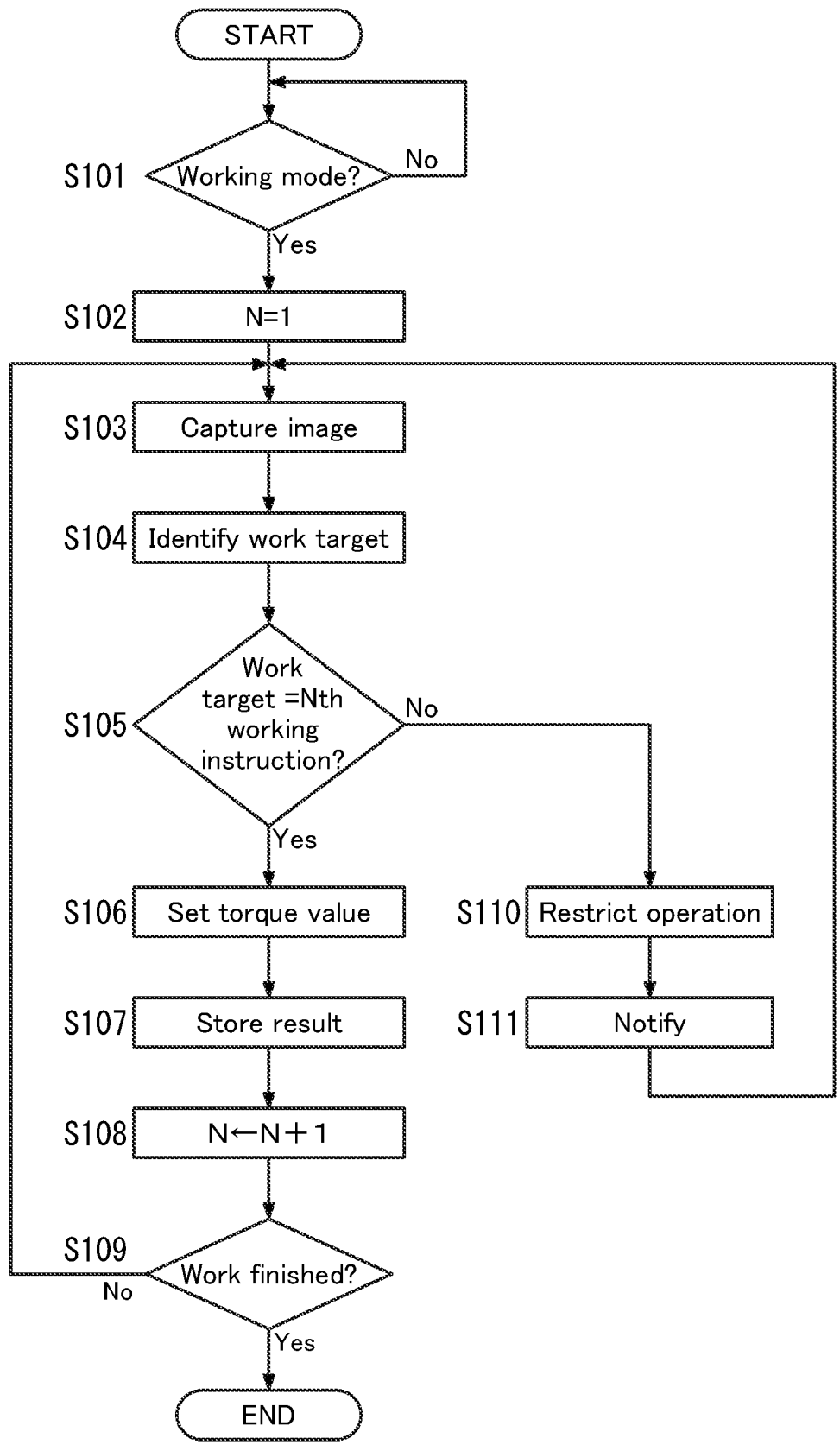
FIG. 5 is a flowchart showing generally how the tool system operates when a work support capability is enabled.

FIG. 5 is a flowchart showing generally how the tool system 1 operates while the control unit 3 is performing the work-support-enabled operation, i.e., while the work support capability of the control unit 3 is enabled. As is clear from FIG. 5, the control unit 3 sequentially performs a plurality of processes one after another while the work support capability is enabled.

Specifically, the control unit 3 determines whether or not the operation mode of the tool 2 is a working mode (in S101). If the operation mode of the tool 2 is not the working mode (if the answer is NO in S101), then the control unit 3 performs this processing step S101 repeatedly. On the other hand, if the operation mode of the tool 2 is the working mode (if the answer is YES in S101), then the control unit 3 advances to the next processing step S102 in which the control unit 3 makes the processing unit 34 set the place N in the working process as indicated by the working instruction according to the working procedure at "one" (in S102). Thereafter, the control unit 3 makes the image capturing control unit 32 control the image capturing unit 5 to capture an image of the work target, thus making the image capturing unit 5 generate a captured image (in S103).

Next, the control unit 3 makes the processing unit 34 perform the target identification processing of identifying, using the captured image, the work target shot in the captured image to be an actually shot work target (in S104). Then, the control unit 3 makes the processing unit 34 perform the procedure determination processing of determining the correspondence between the work target thus identified and the working instruction defined by the working procedure (in S105). In this processing step, the processing unit 34 determines whether or not the work target identified based on the captured image (i.e., the actually shot work target) agrees with the work target included in the working instruction for the $N^{th}$ place in the working process.

If the decision made in the procedure determination processing indicates agreement (i.e., if the answer is YES in S105), i.e., if the work target thus identified conforms to the working instruction defined by the working procedure, then the control unit 3 makes the processing unit 34 set a target torque value included in the working instruction as the torque setting (in S106). If fastening work of the fastening member is performed using the tool 2, the control unit 3 makes the decision unit 36 store the result of the work at this time (i.e., the decision indicating whether or not a fastening torque of the fastening member is normal) in the result storage unit 43 (in S107). Then, the control unit 3 makes the processing unit 34 increase, by one, the place N in the working process corresponding to the working instruction defined by the working procedure (in S108) and determines whether or not every work according to the working procedure has been done yet (in S109). In this case, if the increased place N in the working process is greater than the place in the working process corresponding to the last working instruction defined by the working procedure, then the control unit 3 decides that every work should have been done (i.e., the answer is YES in S109) to end the series of processing steps in the working mode. On the other hand, if not every work has been done yet (if the answer is NO in S109), then the control unit 3 goes back to the processing step S103 to repeatedly perform the same series of processing steps on the next work target.

On the other hand, if the decision made in the procedure determination processing indicates disagreement (if the answer is NO in S105), i.e., if the work target thus identified does not conform to the working instruction defined by the working procedure, then the control unit 3 makes the processing unit 34 restrict (suspend) the operation of the driving unit 24 (in S110). Then, the control unit 3 makes the notification control unit 35 light the notification unit 211, thereby notifying the user that he or she has failed to follow the correct working procedure (in S111). Thereafter, the control unit 3 goes back to the processing step S103 to perform the same series of processing steps all over again.

Note that the flowchart shown in FIG. 5 shows just an exemplary operation of the tool system 1. Thus, the processing steps shown in FIG. 5 may be performed in a different order as appropriate, an additional processing step may be performed as needed, or at least one of the processing steps may be omitted as appropriate.

(3.3) Disabling Work Support Capability

Next, it will be described with reference to FIG. 6 how the tool system 1 operates if the control unit 3 suspends the work-support-enabled operation (i.e., when the control unit 3 disables the work support capability).

Specifically, in this embodiment, the control unit 3 is configured to selectively enable or disable the work support capability as described above. While the work support capability is enabled, the control unit 3 places a restriction on the operation of the tool 2 when finding the work target identified based on the captured image generated by the image capturing unit 5 not conforming to the working instruction defined by the working procedure as already described in the "(3.2) Working mode" section. On the other hand, when finding a predetermined lifting condition satisfied while performing the work-support-enabled operation, the control unit 3 suspends the work-support-enabled operation, i.e., disables the work support capability.

Then, while the work-support-enabled operation is suspended, the tool 2 may be driven arbitrarily with the operation of the driving unit 24 not restricted by the work support capability, i.e., with the driving unit 24 activated without restriction. Thus, when the work support capability is disabled, the control unit 3 basically lifts the restriction on the operation of the (driving unit 24 of the) tool 2. That is to say, according to this embodiment, when finding a predetermined lifting condition satisfied while performing the work-support-enabled operation, the control unit 3 suspends the work-support-enabled operation and lifts the restriction on the operation of the tool 2.

In this case, the lifting condition includes a condition that the operation acceptance unit 33 accepts the user's operating command for lifting (hereinafter referred to as the "user's lifting operation"). In particular, in this embodiment, the operation acceptance unit 33 accepting the user's lifting operation is set as the only lifting condition. In other words, the lifting operating itself is the lifting condition. As soon as the operation acceptance unit 33 accepts the user's lifting operation while the control unit 3 is performing the work-support-enabled operation, the control unit 3 suspends the work-support-enabled operation.

In the following example, the operation of pressing the trigger switch 221 and the press button switches 232 simultaneously is supposed to be defined as the "lifting operation." Thus, the user's pressing the trigger switch 221 and the press button switches 232 simultaneously means that the user has performed the lifting operation. That is to say, this allows the user to perform the lifting operation and thereby disable the work support capability of the control unit 3 by, for example, pulling the trigger switch 221 while pressing the press button switches 232 in a state where the work support capability is enabled. Thus, the user is allowed to lift the restriction on the operation of the tool 2 intentionally simply by performing the lifting operation, even when a fastening member, on which the work has been done once, needs to be further tightened or subjected to re-tightening from the beginning, or when an irregular type of work needs to be conducted, for example, while the user is performing his or her work following the working procedure.

Furthermore, in this embodiment, the control unit 3 returns to the work-support-enabled operation when finding a returning condition satisfied while suspending the work-support-enabled operation. That is to say, according to this embodiment, even if the work support capability is once disabled in a state where the work support capability is enabled (i.e., while the control unit 3 is performing the work-support-enabled operation), the control unit 3 is still allowed to return to the work-support-enabled operation by enabling the work support capability again after that. In other words, when finding a predetermined returning condition satisfied while suspending the work-support-enabled operation, the control unit 3 returns to the work-support-enabled operation, i.e., enables the work support capability. Then, once the control unit 3 has returned to the work-support-enabled operation, the control unit 3 places a restriction on the operation of the tool 2 when finding the work target identified based on the captured image generated by the image capturing unit 5 not conforming to the working instruction defined by the working procedure.

In this case, the returning condition includes a condition that the operation acceptance unit 33 accept the user's operating command for returning (hereinafter referred to as the "user's returning operation"). In particular, in this embodiment, the operation acceptance unit 33 accepting the user's returning operating is set as the only returning condition. In other words, the returning operation itself is the returning condition. As soon as the operation acceptance unit 33 accepts the user's returning operation while the control unit 3 is suspending the work-support-enabled operation, the control unit 3 returns to the work-support-enabled operation.

In the following example, the operation of pressing the trigger switch 221 and the press button switches 232 simultaneously is supposed to be defined as the "returning operation." Thus, the user's pressing the trigger switch 221 and the press button switches 232 simultaneously means that the user has performed the returning operation. That is to say, this allows the user to perform the returning operation and thereby enable the work support capability of the control unit 3 by, for example, pulling the trigger switch 221 while pressing the press button switches 232 in a state where the work support capability is disabled. Thus, the user is allowed to have the operation of the tool 2 restricted again by the work support capability intentionally simply by performing the returning operation, even when a fastening member needs to be further tightened or subjected to re-tightening from the beginning, or when an irregular type of work has been done, for example.

As described above, the control unit 3 sequentially performs a plurality of processes while the work support capability is enabled (see FIG. 5). Thus, when returning to the work-support-enabled operation after having suspended the work-support-enabled operation once, the control unit 3 may resume the work-support-enabled operation in various patterns as for from which of the plurality of processes the control unit 3 resumes the work-support-enabled operation. In this embodiment, the control unit 3 has at least the following three returning patterns (which will be hereinafter referred to as "first, second, and third returning patterns," respectively).

Specifically, according to the first returning pattern, when finding a returning condition satisfied, the control unit 3 resumes the work-support-enabled operation from a process, in which the control unit 3 has suspended the work-support-enabled operation (hereinafter referred to as a "suspended process"), out of the plurality of processes. For example, if the work-support-enabled operation has been suspended while work is being performed on the second work target in the second place in the working process, the control unit 3 resumes, according to the first returning pattern, the work-support-enabled operation with the work on the second work target. Thus, the first returning pattern enables resuming the previous work without skipping or redoing work on any work target. In other words, the control unit 3 has the capability of, when returning to the work-support-enabled operation after having suspended the work-support-enabled operation once in a suspended process out of the plurality of processes, resuming the work-support-enabled operation from the suspended process out of the plurality of processes.

According to the second returning pattern, when finding a returning condition satisfied, the control unit 3 resumes the work-support-enabled operation from a process, following the process in which the control unit 3 has suspended the work-support-enabled operation, out of the plurality of processes. In the following description, the process in which the control unit 3 has suspended the work-support-enabled operation will be hereinafter referred to as a "suspended process" and the process following the suspended process will be hereinafter referred to as a "following process." For example, if the work-support-enabled operation has been suspended while work is being performed on the second work target in the second place in the working process, the control unit 3 resumes, according to the second returning pattern, the work-support-enabled operation with the work on the third work target in the third place in the working process. Thus, the second returning pattern enables resuming the previous work while skipping the work on the work target. In other words, the control unit 3 has the capability of, when returning to the work-support-enabled operation after having suspended the work-support-enabled operation once in the suspended process out of the plurality of processes, resuming the work-support-enabled operation from the following process, following the suspended process, out of the plurality of processes.

According to the third returning pattern, when finding a returning condition satisfied, the control unit 3 resumes the work-support-enabled operation from a process, preceding the process in which the control unit 3 has suspended the work-support-enabled operation, out of the plurality of processes. In the following description, the process in which the control unit 3 has suspended the work-support-enabled operation will be hereinafter referred to as a "suspended process" and the process preceding the suspended process will be hereinafter referred to as a "preceding process." For example, if the work-support-enabled operation has been suspended while work is being performed on the second work target in the second place in the working process, the control unit 3 resumes, according to the third returning pattern, the work-support-enabled operation with the work on the first work target in the first place in the working process. Thus, the third returning pattern enables resuming the previous work while redoing the work on the work target. In other words, the control unit 3 has the capability of, when returning to the work-support-enabled operation after having suspended the work-support-enabled operation once in the suspended process out of the plurality of processes, resuming the work-support-enabled operation from the preceding process, preceding the suspended process, out of the plurality of processes.

Furthermore, according to this embodiment, it is determined in accordance with the user's operating command accepted by the operation acceptance unit 33 which of these first to third returning patterns is adopted. That is to say, it is determined in accordance with the user's operating command accepted by the operation acceptance unit 33 from which of the plurality of processes the control unit 3 resumes the work-support-enabled operation when returning to the work-support-enabled operation.

Specifically, the control unit 3 selects any one of the first to third returning patterns according to the type of the returning operation performed. In this embodiment, the operation of pressing the trigger switch 221 and the press button switches 232 simultaneously is defined as the "returning operation" as an example. In this case, a plurality of press button switches 232 are provided, and therefore, any one of the first to third returning patterns is selected depending on which of the plurality of press button switches 232 is used for the returning operation. For example, if a first press button switch 232, out of the plurality of press button switches 232 including first to third press button switches 232, and the trigger switch 221 are pressed simultaneously to perform the returning operation, then the first returning pattern is selected. On the other hand, if a second press button switch 232, out of the plurality of press button switches 232, and the trigger switch 221 are pressed simultaneously to perform the returning operation, then the second returning pattern is selected. In the same way, if a third press button switch 232, out of the plurality of press button switches 232, and the trigger switch 221 are pressed simultaneously to perform the returning operation, then the third returning pattern is selected.

Figure 6:
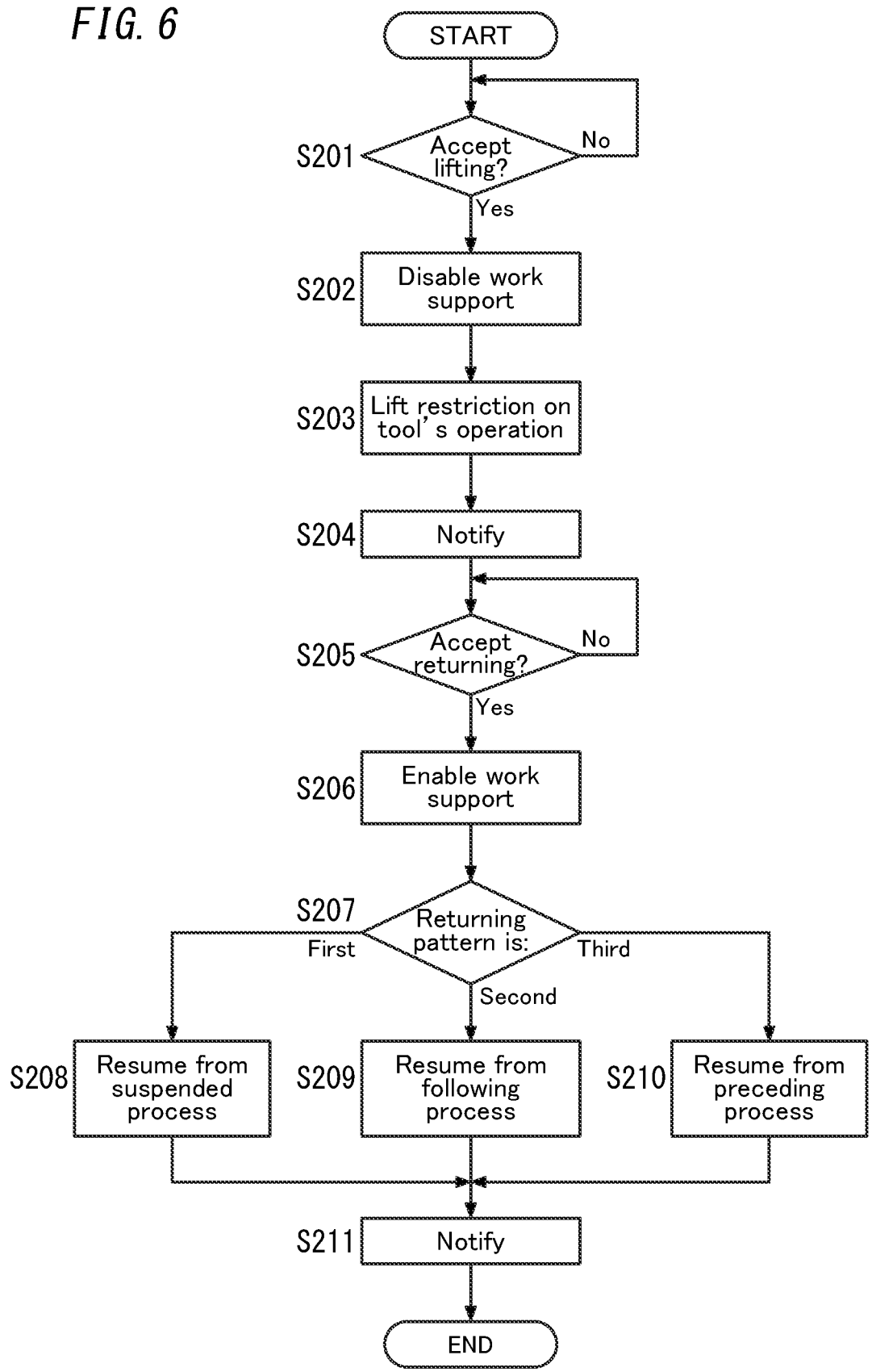
FIG. 6 is a flowchart showing the processing of disabling the work support capability in the tool system and the processing of resuming work-support-enabled operation thereof.

FIG. 6 is a flowchart showing the procedure of the processing of suspending the control unit's 3 work-support-enabled operation (i.e., the processing of disabling the work support capability) and the procedure of the processing of resuming the work-support-enabled operation (i.e., the processing of enabling the work support capability). In this embodiment, the processing of suspending the control unit's 3 work-support-enabled operation (i.e., the processing of disabling the work support capability) is interrupt processing in the working mode, and the work support capability may be suspended at any timing as long as the control unit 3 is operating in the working mode. That is to say, the flowchart shown in FIG. 6 shows interrupt processing which may be performed at any stage during the series of processing steps S102-S111 shown in FIG. 5 (i.e., shows an interrupt flowchart).

First, the control unit 3 determines whether or not the operation acceptance unit 33 accepts the user's lifting operation (in S201). If the operation acceptance unit 33 does not accept the user's lifting operation (if the answer is NO in S201), then the control unit 3 performs this processing step S201 repeatedly.

On the other hand, if the operation acceptance unit 33 accepts the user's lifting operation (e.g., pressing the trigger switch 221 and the press button switches 232 simultaneously in this example) (if the answer is YES in S201), then the control unit 3 disables the work support capability and suspends the work-support-enabled operation (in S202). In this example, suppose the user's lifting operation is performed in a situation where the operation of the tool 2 is restricted and notification is made due to the decision that the second work target in the second place in the working process should not conform to the working instruction. In that case, the suspended process is the process in which notification is made about the second work target (S111 in FIG. 5).

When disabling the work support capability, the control unit 3 lifts the restriction on the operation of the (driving unit 24 of the) tool 2 at that point in time (in S203). That is to say, unless the operation of the tool 2 is restricted by the work support capability in the first place, there is no need for the control unit 3 to lift the restriction on the operation of the tool 2. If any restriction is placed on the operation of the tool 2, then the control unit 3 lifts that restriction.

Furthermore, the control unit 3 makes the notification control unit 35 flicker the notification unit 211, thereby making a notification that the work support capability has been disabled (in S204). The notification that the work support capability has been disabled will be basically posted continuously until the work support capability is enabled after that. This allows the user to learn, by looking at the notification unit 211, that the tool 2 is ready to be driven arbitrarily with the operation of the driving unit 24 not restricted. In this state, the user is allowed to further tighten a fastening member, on which the work has been done once, re-tighten the fastening member from the beginning, or conduct an irregular type of work, for example, by using the tool 2.

Thereafter, the control unit 3 determines whether or not the operation acceptance unit 33 accepts the user's returning operation (in S205). If the operation acceptance unit 33 does not accept the user's returning operation (if the answer is NO in S205), then the control unit 3 performs this processing step S205 repeatedly.

On the other hand, if the operation acceptance unit 33 accepts the user's returning operation (e.g., pressing the trigger switch 221 and the press button switches 232 simultaneously in this example) (if the answer is YES in S205), then the control unit 3 enables the work support capability and resumes the work-support-enabled operation (in S206). At this time, the control unit 3 determines, by recognizing the type of the returning operation performed, which of the first to third returning patterns should be followed (in S207). If the first returning pattern has been selected (if the answer is "first" in S207), then the control unit 3 resumes the work-support-enabled operation from the suspended process (i.e., the process in which notification is made about the second work target (S111 shown in FIG. 5)) (in S208). If the second returning pattern has been selected (if the answer is "second" in S207), then the control unit 3 resumes the work-support-enabled operation from a process following the suspended process (i.e., the process on the third work target in the third place in the working process) (in S209). If the third returning pattern has been selected (if the answer is "third" in S207), then the control unit 3 resumes the work-support-enabled operation from a process preceding the suspended process (i.e., the process on the first work target in the first place in the working process) (in S210).

Furthermore, the control unit 3 makes the notification control unit 35 light the notification unit 211, thereby making a notification that the work support capability has been enabled (in S211).

The control unit 3 performs this series of processing steps S201-S211 repeatedly as interrupt processing with respect to the processing illustrated by the flowchart shown in FIG. 5. Note that the flowchart shown in FIG. 6 shows just an exemplary operation of the tool system 1. Thus, the processing steps shown in FIG. 6 may be performed in a different order as appropriate, an additional processing step may be performed as needed, or at least one of the processing steps may be omitted as appropriate.

(4) Variations

Note that the first embodiment described above is only an exemplary one of various embodiments of the present disclosure and should not be construed as limiting. Rather, the first embodiment may be readily modified in various manners depending on a design choice or any other factor without departing from the scope of the present disclosure. The drawings to be referred to in this description are all schematic representations. The ratio of the dimensions (including thicknesses) of respective constituent elements illustrated on the drawings does not always reflect their actual dimensional ratio. Also, the functions of the tool system 1 according to the first embodiment may also be implemented as a tool management method, a (computer) program, or a non-transitory storage medium that stores the program thereon. A tool management method according to an aspect includes a first step, a second step, and a third step. The first step includes acquiring a captured image from an image capturing unit 5 provided for a portable tool 2. The tool 2 includes a driving unit 24 to be activated with power supplied from a power source. The second step includes placing a restriction on operation of the tool 2 when a work target identified based on the captured image does not conform to a working instruction defined by a working procedure. The third step includes suspending, when a lifting condition is satisfied during the second step, the second step and thereby lifting the restriction on the operation of the tool 2. A program according to another aspect is designed to cause one or more processors to perform the tool management method described above.

Next, variations of the first embodiment will be enumerated one after another. Note that the variations to be described below may be adopted as appropriate in combination. In the following description, any constituent element, having the same function as a counterpart of the first embodiment described above, will be designated by the same reference numeral as that counterpart's, and description thereof will be omitted as appropriate herein.

The tool system 1 according to the present disclosure includes a computer system in the control unit 3 thereof, for example. The computer system may include, as principal hardware components, a processor and a memory. The functions of the tool system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the tool system 1 are integrated together in a single housing (body 20). However, this is not an essential configuration for the tool system 1. Alternatively, those constituent elements of the tool system 1 may be distributed in multiple different housings. For example, some functions of the control unit 3 may be provided in a housing provided separately from the body 20 of the tool 2. Still alternatively, at least some functions of the control unit 3, for example, may be implemented as a server or a cloud computing system as well.

Note that the tool system 1 does not have to be applied to the assembly line, on which products are assembled at a factory, but may find any other application as well.

In the first embodiment described above, the tool 2 is an impact wrench. However, the tool 2 does not have to be an impact wrench but may also be a nut runner or an oil pulse wrench, for example. Alternatively, the tool 2 may also be a screwdriver (including an impact screwdriver) for use to fasten screws (as fastening members), for example. In that case, a bit (such as a screwdriver bit) is attached to the tool 2 instead of the socket 242. Furthermore, the tool 2 does not have to be configured to be powered by the battery pack 201 but may also be configured to be powered by an AC power supply (commercial power supply). Moreover, the tool 2 does not have to be an electric tool but may also be an air tool including an air motor (driving unit) to be operated by compressed air (power) supplied from an air compressor (power source).

Also, in the first embodiment described above, the work target is supposed to be each of a plurality of portions to be fastened in a single workpiece. However, this is only an example and should not be construed as limiting. Alternatively, the work target may also be a module, part, or product with a plurality of portions to be fastened. In that case, the plurality of portions to be fastened of a single work target may have either the same target torque value or mutually different target torque values.

Also, the control unit 3 only needs to have the work support capability. Thus, the control unit 3 may have various other capabilities as well, in addition to the work support capability. For example, the control unit 3 may perform the processing of outputting an image as a log (including writing image into a memory). This allows the control unit 3 to output, as a log, an image suitable for the user to confirm or for a computer to analyze. Alternatively, the control unit 3 may also perform, for example, the processing of instructing the user the work to do. In that case, the control unit 3 may perform the processing of determining whether the work that has been done is good or bad.

Optionally, the tool 2 may include a torque sensor for measuring the fastening torque. In that case, the driving control unit 31 controls the driving unit 24 such that the fastening torque measured by the torque sensor becomes the torque setting. Furthermore, the decision unit 36 may determine, by comparing the result of measurement by the torque sensor with the target torque value, whether or not the fastening torque is normal. When finding the result of measurement by the torque sensor falling within a predetermined range based on the target torque value, the decision unit 36 decides that the fastening torque should be a normal one. On the other hand, when finding the result of measurement by the torque sensor falling outside of the predetermined range based on the target torque value, the decision unit 36 decides that the fastening torque should be an insufficient (abnormal) one.

Note that the image registration processing does not have to be the processing of making the image storage unit 41 store, as a reference image, the still image generated by the image capturing unit 5. Alternatively, the image registration processing may also be the processing of registering, as a reference image, a still image downloaded from a server with the image storage unit 41, or the processing of registering, as a reference image, a still image acquired from an external memory such as a memory card with the image storage unit 41.

Furthermore, the notification unit 211 does not have to be a light-emitting unit such as an LED but may also be implemented as an image display device such as a liquid crystal display or an organic electroluminescent (EL) display. Optionally, the notification unit 211 may make notification (presentation) by any means other than displaying. For example, the notification unit 211 may also be implemented as a loudspeaker or a buzzer that emits a sound (including a voice). In that case, the notification control unit 35 preferably makes the notification unit 211 emit different sounds in a situation where the decision made by the processing unit 34 indicates disagreement and in a situation where the processing unit 34 has identified the actually shot work target. Still alternatively, the notification unit 211 may also be implemented as a vibrator that produces vibration or a transmitter for transmitting a notification signal to an external terminal (such as a mobile communications device) provided outside of the tool 2. Optionally, the notification unit 211 may also have, in combination, two or more functions selected from displaying, emitting a sound, producing vibration, and establishing communication.

The storage unit 4 may store working procedure data indicating a predetermined order in which working process steps are to be performed on a plurality of work targets. In that case, the processing unit 34 selects, in accordance with the working procedure, a reference image for use in image processing (pattern matching) out of the plurality of reference images. Specifically, the processing unit 34 preferentially selects one reference image, corresponding to a forthcoming work target to be processed in a forthcoming working process step, out of the plurality of reference images. As used herein, the "forthcoming work target" is a work target to be processed next to the work target that has been identified last time. The processing unit 34 performs image processing of comparing the reference image selected as template data with the captured image. That is to say, the processing unit 34 selects the reference image by predicting the work target to be shot in the captured image next time in accordance with the working procedure. This allows the processing unit 34 to identify, in a shorter time, the work target shot in the captured image.

Optionally, the processing unit 34 may also be configured to determine the type of the socket 242 attached to the tool 2 by performing image processing on the image captured by the image capturing unit 5. As used herein, the "type" is a piece of information for distinguishing different parts from each other and includes at least one piece of information about the size (dimension or length), shape, or material. In this embodiment, the processing unit 34 is configured to determine the length of the socket 242 attached to the tool 2. The processing unit 34 corrects, according to the length of the socket 242, the target torque value and sets the target torque value thus corrected as the torque setting. For example, the processing unit 34 corrects a target torque value associated with the actually shot work target by multiplying the target torque value by a coefficient corresponding to the length of the socket 242 and sets the target torque value thus corrected as the torque setting. That is to say, the processing unit 34 controls the driving unit 24 such that the fastening torque becomes equal to the corrected target torque value. This may reduce dispersion in fastening torque according to the length of the socket 242.

Alternatively, the processing unit 34 may also be configured to determine the torque setting according to the detected length (or type) of the socket 242. In the storage unit 4, stored are torque values corresponding one to one to various lengths of the socket 242. The processing unit 34 acquires, from the storage unit 4, a torque value corresponding to the determined length of the socket 242 and sets a value, based on the torque value thus acquired, as the torque setting. For example, the processing unit 34 may set the torque value, acquired from the storage unit 4, as the torque setting. This allows the fastening work to be performed at a torque value corresponding to the type of the socket 242.

Furthermore, the captured image generated by the image capturing unit 5 does not have to be a moving picture but may also be, for example, a still picture when the fastening work is done. If the captured image is a still picture, then the decision unit 36 makes the result storage unit 43 store the still picture generated by the image capturing unit 5 in association with the decision result. This allows the user to confirm the still picture of a work target, of which the fastening torque has turned out to be insufficient, for example.

The image capturing unit 5 does not have to be provided for the barrel 21 of the body 20 but may also be provided, for example, for the attachment member 23 of the body 20 or the battery pack 201. Likewise, the arrangement of the control unit 3, the storage unit 4, and other components may also be changed as appropriate.

Furthermore, the user's operating command to be accepted by the operation acceptance unit 33 does not have to be entered by operating either the trigger switch 221 or the plurality of press button switches 232 on the control panel 231. Alternatively, the operation acceptance unit 33 may also accept, as the user's operating command, the voice input or gesture input made by the user, or acceleration or vibration applied to the tool 2 by the user. Still alternatively, the operation acceptance unit 33 may also accept the user's operating command upon receiving an operating signal transmitted, in response to the user's operation on an external terminal (such as a mobile communications device), from the external terminal to the tool 2. Yet alternatively, the operation acceptance unit 33 may have, in combination, two or more input means selected from various input means such as these.

Furthermore, the lifting condition does not have to be the operation of pressing the trigger switch 221 and the press button switches 232 simultaneously (i.e., the lifting operation). Alternatively, the lifting condition may also include any other particular operation such as holding down the press button switches 232 or pressing the press button switches 232 twice. Still alternatively, if the operation acceptance unit 33 accepts an operation other than pressing the trigger switch 221 and the press button switches 232 (such as the voice input or the gesture input) as the user's operating command, then any of those alternative operations may be regarded as the lifting operation. Furthermore, the lifting condition may also include a condition concerning, for example, continuous working time, specific time slot of the day, or results of detection by other sensors, either instead of, or in addition to, the user's lifting operation.

Likewise, the returning condition does not have to be the operation of pressing the trigger switch 221 and the press button switches 232 simultaneously (i.e., the returning operation), either. Alternatively, the returning condition may also include any other particular operation such as holding down the press button switches 232 or pressing the press button switches 232 twice. Still alternatively, if the operation acceptance unit 33 accepts an operation other than pressing the trigger switch 221 and the press button switches 232 (such as the voice input or gesture input) as the user's operating command, then any of those alternative operations may be regarded as the returning operation. Furthermore, the returning condition may also include a condition concerning, for example, the time that has passed since the work support capability has been disabled, specific time slot of the day, or results of detection by other sensors, either instead of, or in addition to, the user's returning operation. The returning condition and the lifting condition may be the same, or different from each other.

Furthermore, when returning to the work-support-enabled operation, the control unit 3 may determine, in accordance with the user's operating command accepted by the operation acceptance unit 33, not by the type of the returning operation, from which of the plurality of processes the control unit 3 should resume the work-support-enabled operation. For example, the control unit 3 may select, according to the type of the lifting operation, any one of the first to third returning patterns. Alternatively, the control unit 3 may select, in accordance with the user's operating command different from the returning operation and the lifting operation, any one of the first to third returning patterns.

Figure 7:
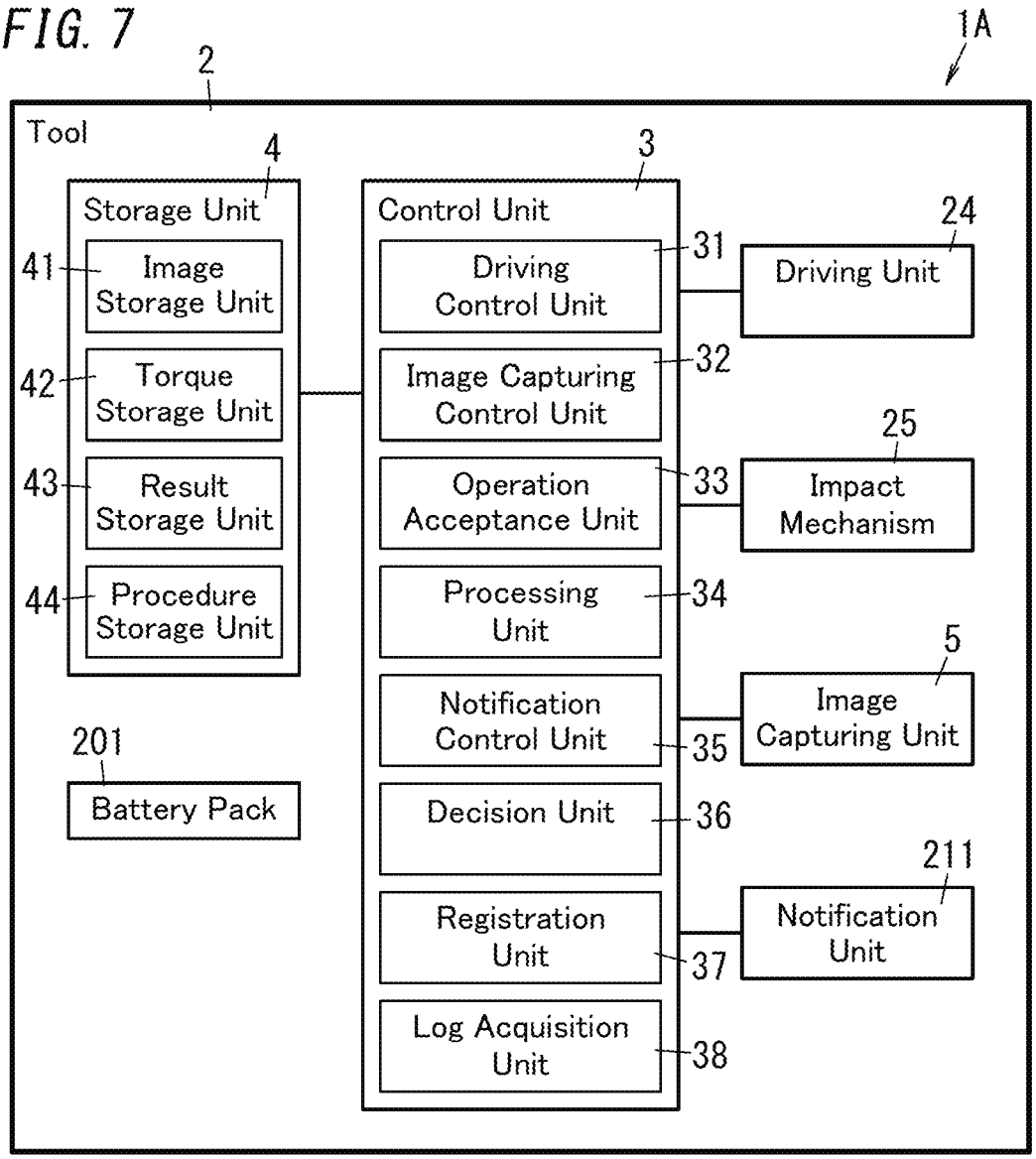
FIG. 7 is a block diagram of a tool system according to a second embodiment.

Furthermore, when returning to the work-support-enabled operation, the control unit 3 determines, in accordance with the user's operation accepted by the operation acceptance unit 33, from which of the plurality of processes the control unit 3 should resume the work-support-enabled operation. However, this is not an essential feature for the tool system 1. Alternatively, any one of the first, second, and third returning patterns may always be selected, for example, as a pattern to be followed whenever the control unit 3 returns to the work-support-enabled operation, irrespective of the user's operating command Second Embodiment A tool system 1A according to a second embodiment further includes a log acquisition unit 38 as shown in FIG. 7, which is a major difference from the tool system 1 according to the first embodiment. In the following description, any constituent element of this second embodiment, having the same function as a counterpart of the first embodiment described above, will be designated by the same reference numeral as that counterpart's, and description thereof will be omitted as appropriate herein.

In this embodiment, the log acquisition unit 38 may be provided, for example, as one of the functions to be performed by the control unit 3. In other words, the control unit 3 includes the log acquisition unit 38. The log acquisition unit 38 acquires, as a log, the history of operation of the tool 2 while the work-support-enabled operation is suspended. That is to say, even during a period in which the work support capability is disabled with the lifting condition satisfied, the record of work using the tool 2 may also be left as a log. The log acquisition unit 38 acquires, as a log, the magnitude of the fastening torque based on the number of strokes by the impact mechanism 25 and the image captured by the image capturing unit 5 (i.e., the captured image) during the work and makes the result storage unit 43 store the log thus acquired. In this case, the log acquired during the period in which the work support capability is disabled and the log acquired while the work support capability is enabled (e.g., the decision made by the decision unit 36)

may be stored in the result storage unit 43 either in combination with each other or distinguishably from each other.

In addition, in the tool system 1A according to this embodiment, when returning to the work-support-enabled operation, the control unit 3 automatically determines from which of the plurality of processes the control unit 3 resumes the work-support-enabled operation, which is another major difference from the tool system 1 according to the first embodiment. Specifically, according to the first embodiment, it is determined in accordance with the user's operating command accepted by the operation acceptance unit 33 which of the first to third returning patterns should be adopted. On the other hand, according to this embodiment, it is determined automatically which of the first to third returning patterns should be adopted.

Specifically, the control unit 3 may, for example, automatically determine, by recognizing the type of the work that has been done with the tool 2 while the work support capability is disabled, from which of the plurality of processes the control unit 3 should resume the work-support-enabled operation. For example, if a fastening member, on which the work has once been done, has been further tightened or has been subjected to re-tightening from the beginning while the work support capability is disabled, then the control unit 3 selects the first returning pattern and resumes the work-support-enabled operation from the suspended process. As another example, if a fastening member, on which the work has not been done yet, has been attached due to an error of the target identification processing, for example, while the work support capability is disabled, then the control unit 3 selects the second returning pattern and resumes the work-support-enabled operation from a process following the suspended process.

In this embodiment, the log acquisition unit 38 is not an essential constituent element for the tool system 1A. That is to say, the log acquisition unit 38 may be omitted as appropriate from the configuration of the second embodiment.

Optionally, the configuration described for the second embodiment (including its variations) may be adopted as appropriate in combination with the various configurations described for the first embodiment (including its variations).

Recapitulation

As can be seen from the foregoing description, a tool system (1, 1A) according to a first aspect includes a portable tool (2), an image capturing unit (5), and a control unit (3). The tool (2) includes a driving unit (24) to be activated with power supplied from a power source. The image capturing unit (5) is provided for the tool (2) and generates a captured image. The control unit (3) controls the tool (2) based on the captured image. The control unit (3) has a work support capability. The work support capability is the capability of placing a restriction on operation of the tool (2) when a work target identified based on the captured image does not conform to a working instruction defined by a working procedure. The control unit (3) suspends, when finding a lifting condition satisfied while performing work-support-enabled operation, the work-support-enabled operation and thereby lifts the restriction on the operation of the tool (2).

According to this aspect, basically, the work support capability allows the control unit (3) to identify, based on a captured image generated by the image capturing unit (5), the work target and determine whether or not the work that the user is performing using the tool (2) follows the working procedure. In addition, the control unit (3) may place a restriction on the operation of the tool (2) when the work target identified based on the captured image does not conform to a working instruction defined by a working procedure (i.e., when the work that the user is performing using the tool (2) does not follow the working procedure). This enables preventing wrong work, not conforming to the working procedure, from being performed and thereby supporting the user with his or her work in conformity with the working procedure. Furthermore, when a lifting condition is satisfied while the work-support-enabled operation is being performed, the work-support-enabled operation may be suspended and thereby the restriction on the operation of the tool (2) may be lifted. Thus, even when a fastening member, on which the work has been done once, needs to be further tightened or subjected to re-tightening from the beginning, or when an irregular type of work needs to be conducted, for example, while the user is performing his or her work following the working procedure, he or she is still allowed to perform the work using the tool (2) just by lifting the restriction on the operation of the tool (2). Consequently, this achieves the advantage of contributing to improving the handiness of the tool (2).

In a tool system (1, 1A) according to a second aspect, which may be implemented in conjunction with the first aspect, the control unit (3) returns to the work-support-enabled operation when finding a returning condition satisfied while suspending the work-support-enabled operation.

This aspect enables allowing, even if the restriction on the operation of the tool (2) has been once lifted with the work-support-enabled operation suspended, the control unit (3) to resume the work-support-enabled operation when a returning condition is satisfied after that.

In a tool system (1, 1A) according to a third aspect, which may be implemented in conjunction with the second aspect, the control unit (3) sequentially performs a plurality of processes while the work support capability is enabled. The control unit (3) has the capability of, when returning to the work-support-enabled operation after having suspended the work-support-enabled operation in a suspended process out of the plurality of processes, resuming the work-support-enabled operation from the suspended process out of the plurality of processes.

This aspect enables resuming the work-support-enabled operation at a point in the working process where the work-support-enabled operation has been suspended once.

In a tool system (1, 1A) according to a fourth aspect, which may be implemented in conjunction with the second or third aspect, the control unit (3) sequentially performs a plurality of processes while the work support capability is enabled. The control unit (3) has the capability of, when returning to the work-support-enabled operation after having suspended the work-support-enabled operation in a suspended process out of the plurality of processes, resuming the work-support-enabled operation from a process following the suspended process out of the plurality of processes.

This aspect enables resuming the work-support-enabled operation with at least one process skipped after having once suspended the work-support-enabled operation.

In a tool system (1, 1A) according to a fifth aspect, which may be implemented in conjunction with any one of the second to fourth aspects, the control unit (3) sequentially performs a plurality of processes while the work support capability is enabled. The control unit (3) has the capability of, when returning to the work-support-enabled operation after having suspended the work-support-enabled operation in a suspended process out of the plurality of processes, resuming the work-support-enabled operation from a process preceding the suspended process out of the plurality of processes.

This aspect enables resuming the work-support-enabled operation by redoing at least one process after having once suspended the work-support-enabled operation.

In a tool system (1, 1A) according to a sixth aspect, which may be implemented in conjunction with any one of the second to fifth aspects, the returning condition includes a condition that an operation acceptance unit (33) accept a user's operating command for returning.

This aspect enables, even after the restriction on the operation of the tool (2) has been lifted once with the work-support-enabled operation suspended, resuming the work-support-enabled operation in accordance with the user's operating command for returning.

In a tool system (1, 1A) according to a seventh aspect, which may be implemented in conjunction with any one of the second to sixth aspects, the control unit (3) sequentially performs a plurality of processes while the work support capability is enabled. The control unit (3) automatically determines, when returning to the work-support-enabled operation, from which of the plurality of processes the control unit (3) resumes the work-support-enabled operation.

This aspect eliminates the need for the user to specify from which of the plurality of processes the operation is to be resumed.

In a tool system (1, 1A) according to an eighth aspect, which may be implemented in conjunction with any one of the second to sixth aspects, the control unit (3) sequentially performs a plurality of processes while the work support capability is enabled. The control unit (3) determines, when returning to the work-support-enabled operation, in accordance with a user's operating command accepted by an operation acceptance unit (33), from which of the plurality of processes the control unit (3) resumes the work-support-enabled operation.

This aspect allows the user to specify by him- or herself from which of the plurality of processes the work-support-enabled operation is to be resumed.

In a tool system (1, 1A) according to a ninth aspect, which may be implemented in conjunction with any one of the first to eighth aspects, the lifting condition includes a condition that an operation acceptance unit (33) accept a user's operating command for lifting.

This aspect allows the work support capability to be disabled in accordance with the user's operating command for lifting.

A tool system (1, 1A) according to a tenth aspect, which may be implemented in conjunction with any one of the first to ninth aspects, further includes a log acquisition unit (38). The log acquisition unit (38) acquires, as a log, an operation history of the tool (2) while the control unit (3) is suspending the work-support-enabled operation.

This aspect enables leaving, as a log, the operation history of the tool (2) while the work-support-enabled operation is suspended.

A tool management method according to an eleventh aspect includes a first step, a second step, and a third step. The first step includes acquiring a captured image from an image capturing unit (5) provided for a portable tool (2) including a driving unit (24) to be activated with power supplied from a power source. The second step includes placing a restriction on operation of the tool (2) when a work target identified based on the captured image does not conform to a working instruction defined by a working procedure. The third step includes suspending, when a lifting condition is satisfied during the second step, the second step and thereby lifting the restriction on the operation of the tool (2).

This aspect achieves the advantage of contributing to improving the handiness of the tool (2).

A program according to a twelfth aspect is designed to cause one or more processors to perform the tool management method according to the eleventh aspect.

This aspect achieves the advantage of contributing to improving the handiness of the tool (2).

Note that these are not the only aspects of the present disclosure but various configurations of the tool system (1, 1A) according to the first and second embodiments (including their variations) may also be implemented as a tool management method or a program.

Note that the constituent elements according to the second to tenth aspects are not essential constituent elements for the tool system (1, 1A) but may be omitted as appropriate.

Reference Signs List 1, 1A Tool System
2 Tool
5 Image Capturing Unit
24 Driving Unit
3 Control Unit
33 Operation Acceptance Unit
38 Log Acquisition Unit

The invention claimed is:

1. A tool system comprising:
a portable tool including:
 a driving unit configured to be activated with power supplied from a power source;
 a trigger switch;
 a control panel; and
 an operation acceptance unit;
an image capturing unit provided for the portable tool and configured to generate a captured image; and
a control unit configured to control the portable tool based on the captured image, wherein:
the control unit comprises a work support capability of placing a restriction on operation of the tool when a work target identified based on the captured image does not conform to a working instruction defined by a working procedure,
the control unit is configured to, when finding a lifting condition satisfied while performing a work-support-enabled operation by the work support capability, suspend the work-support-enabled operation and thereby lift the restriction on the operation of the portable tool,
the trigger switch is configured to generate a first operating signal during a period when a user performs a first particular operation on the trigger switch,
the control panel is configured to generate a second operation signal during a period when the user performs a second particular operation on the control panel, and
the lifting condition includes a condition that the operation acceptance unit receives one of the first operation signal or the second operation signal, while the operation acceptance unit receives another of the first operation signal or the second operation signal.

2. The tool system of claim 1, wherein
the control unit is configured to return to the work-support-enabled operation when finding a returning condition satisfied while suspending the work-support-enabled operation.

3. The tool system of claim 2, wherein:
the control unit is configured to sequentially perform a plurality of processes while the work support capability is enabled, and
the control unit is configured to, when returning to the work-support-enabled operation after having suspended the work-support-enabled operation in a suspended process out of the plurality of processes, resume the work-support-enabled operation from the suspended process out of the plurality of processes.

4. The tool system of claim 2, wherein:
the control unit is configured to sequentially perform a plurality of processes while the work support capability is enabled, and
the control unit is configured to, when returning to the work-support-enabled operation after having suspended the work-support-enabled operation in a suspended process out of the plurality of processes, resume the work-support-enabled operation from a process following the suspended process out of the plurality of processes.

5. The tool system of claim 2, wherein:
the control unit is configured to sequentially perform a plurality of processes while the work support capability is enabled, and
the control unit is configured to, when returning to the work-support-enabled operation after having suspended the work-support-enabled operation in a suspended process out of the plurality of processes, resume the work-support-enabled operation from a process preceding the suspended process out of the plurality of processes.

6. The tool system of claim 2, wherein the returning condition includes a condition that the operation acceptance unit accept a user's operating command for returning.

7. The tool system of claim 2, wherein:
the control unit is configured to sequentially perform a plurality of processes while the work support capability is enabled, and
the control unit is configured to, when returning to the work-support-enabled operation, automatically determine from which of the plurality of processes the control unit resumes the work-support-enabled operation.

8. The tool system of claim 2, wherein:
the control unit is configured to sequentially perform a plurality of processes while the work support capability is enabled, and
the control unit is configured to, when returning to the work-support-enabled operation, determine, in accordance with a user's operating command accepted by the operation acceptance unit, from which of the plurality of processes the control unit resumes the work-support-enabled operation.

9. The tool system of claim 1, further comprising a log acquisition unit configured to acquire, as a log, an operation history of the portable tool while the control unit is suspending the work-support-enabled operation.

10. A tool management method comprising:
a first step including acquiring a captured image from an image capturing unit provided for a portable tool, the portable tool including a driving unit, the driving unit being configured to be activated with power supplied from a power source;
a second step including placing a restriction on operation of the portable tool when a work target identified based on the captured image does not conform to a working instruction defined by a working procedure; and
a third step including suspending, when a lifting condition is satisfied during the second step, the second step and thereby lifting the restriction on the operation of the portable tool, wherein:
the lifting condition includes a condition that an operation acceptance unit of the portable tool receives one of a first operation signal or a second operation signal, while the operation acceptance unit receives another of the first operation signal or the second operation signal,
the first operating signal is supplied from a trigger switch of the portable tool during a period when a user performs a first particular operation on the trigger switch, and
the second operation signal is supplied from a control panel of the portable tool during a period when the user performs a second particular operation on the control panel.

11. A non-transitory storage medium storing thereon a program designed to cause one or more processors to perform the tool management method of claim 10.

12. A tool system comprising:
a portable tool including:
a driving unit configured to be activated with power supplied from a power source;
a trigger switch;
a control panel; and
an operation acceptance unit;
an image capturing unit provided for the portable tool and configured to generate a captured image; and
a control unit configured to control the portable tool based on the captured image, wherein:
the control unit comprises a work support capability of placing a restriction on operation of the tool when a work target identified based on the captured image does not conform to a working instruction defined by a working procedure,
the control unit is configured to, when finding a lifting condition satisfied while performing a work-support-enabled operation by the work support capability, suspend the work-support-enabled operation and thereby lift the restriction on the operation of the portable tool,
the trigger switch is configured to generate a first operating signal when the user performs a first particular operation on the trigger switch,
the control panel is configured to generate a second operation signal when the user performs a second particular operation on the control panel, and
the lifting condition includes a condition that the operation acceptance unit receives the first operating signal and the second operation signal simultaneously.

\* \* \* \* \*